United States Patent
Onishi

(10) Patent No.: US 10,320,223 B2
(45) Date of Patent: Jun. 11, 2019

(54) CIRCUIT DEVICE, POWER RECEIVING DEVICE, AND ELECTRONIC APPARATUS

(71) Applicant: SEIKO EPSON CORPORATION, Tokyo (JP)

(72) Inventor: Kota Onishi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 192 days.

(21) Appl. No.: 15/420,934

(22) Filed: Jan. 31, 2017

(65) Prior Publication Data
US 2017/0237276 A1 Aug. 17, 2017

(30) Foreign Application Priority Data
Feb. 12, 2016 (JP) .................... 2016-024569

(51) Int. Cl.
*H02J 7/00* (2006.01)
*H02J 7/02* (2016.01)
*H02J 50/12* (2016.01)
*H02J 7/04* (2006.01)

(52) U.S. Cl.
CPC .............. *H02J 7/025* (2013.01); *H02J 7/042* (2013.01); *H02J 50/12* (2016.02)

(58) Field of Classification Search
CPC ..... G05F 1/56; H02J 7/04; H02J 7/045; H02J 2007/0037; H02J 7/025; H02J 7/042

USPC .......................................................... 320/137
See application file for complete search history.

(56) References Cited

U.S. PATENT DOCUMENTS

| | | | | |
|---|---|---|---|---|
| 2008/0100272 | A1* | 5/2008 | Yoshio | G05F 1/56 323/266 |
| 2008/0159567 | A1* | 7/2008 | Lesso | H02M 3/07 381/120 |
| 2014/0277277 | A1* | 9/2014 | Gordon | A61N 1/378 607/59 |

FOREIGN PATENT DOCUMENTS

JP H10-98836 A 4/1998

* cited by examiner

*Primary Examiner* — Paul Dinh
(74) *Attorney, Agent, or Firm* — Oliff PLC

(57) ABSTRACT

A circuit device includes a power supply portion that supplies power from a battery to a power supply target, and a control portion that controls the power supply portion. The power supply portion includes a charge pump circuit that steps down a battery voltage VBAT of the battery to a voltage that is m/n times the battery voltage VBAT, and supplies the stepped down voltage to the power supply target from a terminal (n is an integer of one or more, m is an integer of one or more and (n−1) or less). The control portion stops a charge pump operation of the charge pump circuit when a voltage VOUT' of the terminal satisfies the expression VOUT'>VBAT×m/n.

10 Claims, 15 Drawing Sheets

| VBAT[V] | 4.200 | 4.100 | 4.000 | 3.950 | 3.900 | 3.850 | 3.800 |
| --- | --- | --- | --- | --- | --- | --- | --- |
| VBAT × 1/3[V] | 1.400 | 1.367 | 1.333 | 1.317 | 1.300 | 1.283 | 1.267 |
| VPROG[V] | 1.333 | 1.333 | 1.333 | 1.333 | 1.333 | 1.333 | 1.333 |
| ibat[mA] | 4.766 | 2.402 | 0.048 | −1.125 | −2.296 | −3.454 | −4.630 |

CIRCUIT DEVICE, POWER RECEIVING DEVICE, AND ELECTRONIC APPARATUS

BACKGROUND

1. Technical Field

The present invention relates to a circuit device, a power receiving device, an electronic apparatus, and the like.

2. Related Art

In recent years, batteries (secondary batteries) have been widely used as a power supply for mobile apparatuses and the like. Batteries can be repeatedly used by being charged. In such a case, it is recommended that the batteries are charged using methods appropriate for the characteristics of the respective batteries.

A technology disclosed in JP-A-10-98836 is a known technology of the method used when a battery is charged. In this known technology, a charge voltage, temperature, and a terminal voltage of the battery are measured, and when the measurement values deviate from an allowable range, the application of a charge voltage is interrupted once, and when the measurement values enter the allowable range, the application of the charge voltage is restarted.

Various paths for supplying power from a battery to a power supply target can be envisioned according to the specification or the like of the power supply target. For example, in the case where an operation voltage of the power supply target is lower than the output voltage of the battery, it is conceived that the output voltage of the battery is stepped down by a charge pump circuit and the stepped down voltage is supplied to the power supply target. At this time, there are cases where some kind of voltage is applied to the output of the charge pump circuit. For example, in a hearing aid, power is supplied from a device for tuning to the hearing aid, and the voltage of the supplied power is applied to the output of the charge pump circuit. In this case, depending on a condition regarding the voltage generated by stepping down the output voltage of the battery and the voltage applied to the output of the charge pump circuit, uncontrolled charging occurs from the charge pump circuit to the battery, and an over-voltage or an over-current may possibly be applied to the battery.

SUMMARY

According to some aspects of the invention, a circuit device, a power receiving device, an electronic apparatus, and the like can be provided in which application of an over-voltage or an over-current to a battery from a charge pump circuit can be suppressed.

One aspect of the invention relates to a circuit device including a power supply portion that supplies power from a battery to a power supply target; and a control portion that controls the power supply portion. The power supply portion includes a charge pump circuit that steps down a battery voltage VBAT of the battery to a voltage that is m/n (n is an integer of one or more, m is an integer of one or more and (n−1) or less) times the battery voltage VBAT, and supplies the stepped down voltage to the power supply target from a terminal, and the control portion stops a charge pump operation of the charge pump circuit when a voltage VOUT' at the terminal satisfies the expression VOUT'>VBAT×m/n.

When a voltage that is higher than a voltage that is m/n times the battery voltage VBAT generated by stepping down the battery voltage VBAT is applied to an output of the charge pump circuit, the expression VOUT'>VBAT×m/n holds. According to one aspect of the invention, in the case where the expression VOUT'>VBAT×m/n holds, a charge pump operation of the charge pump circuit is stopped. Accordingly, when a voltage that is higher than the voltage that is m/n times the battery voltage VBAT generated by stepping down the battery voltage VBAT is applied to the output of the charge pump circuit, the charge pump operation of the charge pump circuit can be stopped. As a result of the charge pump operation being stopped, application of an over-voltage or an over-current to the battery from the charge pump circuit can be suppressed.

Also, in one aspect of the invention, the circuit device includes a detection circuit to which the battery voltage VBAT and the voltage VOUT' at the terminal are input and that outputs a detection signal that is activated when the expression VOUT'>VBAT×m/n holds. The control portion may stop a charge pump operation of the charge pump circuit when the detection signal is activated.

In this way, whether or not the expression VOUT'>VBAT×m/n holds is detected based on the battery voltage VBAT and the voltage VOUT' at the terminal. Based on the detection signal, which is the detection result, in the case where the expression VOUT'>VBAT×m/n holds, the charge pump operation can be stopped.

Also, in one aspect of the invention, the control portion may stop the charge pump operation by deactivating a switching signal for a charge pump transistor included in the charge pump circuit when the expression VOUT'>VBAT×m/n holds.

Because switching of the capacitor is stopped by inactivating the switching signal, voltage conversion (charge transfer) by the charge pump circuit can be stopped. Accordingly, a charging path from the charge pump circuit to the battery is cut off, and the battery can be protected.

Also, in one aspect of the invention, the control portion may restart the charge pump operation that has been stopped when a predetermined restart condition is satisfied.

In this way, the charge pump operation that has been stopped once when the expression VOUT'>VBAT×m/n held can be started again when a predetermined restart condition is satisfied. For example, in an example of the hearing aid described above, when the tuning is finished and the predetermined restart condition has been satisfied, the charge pump operation can be restarted, and power supply to the hearing aid can be restarted.

Also, in one aspect of the invention, the control portion may restart the charge pump operation that has been stopped when predetermined operation information is input to an operation portion of an electronic apparatus in which the circuit device is included.

In this way, the charge pump operation can be restarted by a user or the like performing the predetermined operation on the operation portion after the expression VOUT'>VBAT×m/n no longer holds (that is, after a voltage ceases to be applied to the output of the charge pump circuit).

Also, in one aspect of the invention, the power supply portion may include a charging portion that supplies power to the battery so as to charge the battery, and a discharging portion that includes the charge pump circuit and performs a discharging operation that supplies power charged to the battery the power supply target.

In such a configuration, when a voltage or a current is supplied to the terminal of the battery from the discharging portion, the battery is charged through a path that is different from a charging path to the battery from the charging portion. According to one aspect of the invention, application of an over-voltage or an over-current to the battery through such a charging path that is not controlled by the charging portion can be suppressed.

Also, in one aspect of the invention, the power supply portion may supply power that has been received by a power receiving portion through contactless power transmission to the battery so as to charge the battery.

In contactless power transmission, power transmission is enabled when the power receiving device is landed on the power transmitting device, and power transmission is stopped when the power receiving device is removed from the power transmitting device. This removal may be performed at an arbitrary timing by a user, and the battery voltage at the timing is uncertain. According to one aspect of the invention, even in such a case where a voltage is applied to the output of the charge pump circuit in a state in which the battery voltage is uncertain, the battery can be protected.

Also, in one aspect of the invention, the control portion may cause the discharging portion to stop the discharging operation when landing has been detected, and cause the discharging portion to perform the discharging operation in a removed period.

In the case where the discharging portion is caused to perform the discharging operation in the removed period, when the power receiving device is removed from the power transmitting device, power supply from the battery to the power supply target is started. For example, in the example of the hearing aid described above, power supply is essentially turned on before tuning. Therefore, it is possible that the tuning device is connected to the hearing aid whose power supply (charge pump operation) has not been turned off due to an operation being forgotten or the like. According to one aspect of the invention, even in a case where a voltage is applied to the output of the charge pump circuit, the battery can be protected.

Also, another aspect of the invention relates to a power receiving device including the circuit device according to any of the above descriptions.

Also, yet another aspect of the invention relates to an electronic apparatus including the circuit device according to any of the above descriptions.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferable embodiment of the invention will be described in detail. Note that the embodiment described below is not intended to unduly limit the content of the invention described in the scope of the claims, and not all configurations described in this embodiment are necessarily essential as solving means of the invention.

Hereinafter, a case where an electronic apparatus is a hearing aid will be described as an example, but the electronic apparatus to which the invention can be applied is not limited to a hearing aid. For example, the invention can be applied to an electronic apparatus in which the output of a charge pump circuit may possibly be short-circuited to some kind of power supply or the like.

1. Hearing Aid (Electronic Apparatus)

Figure 1:
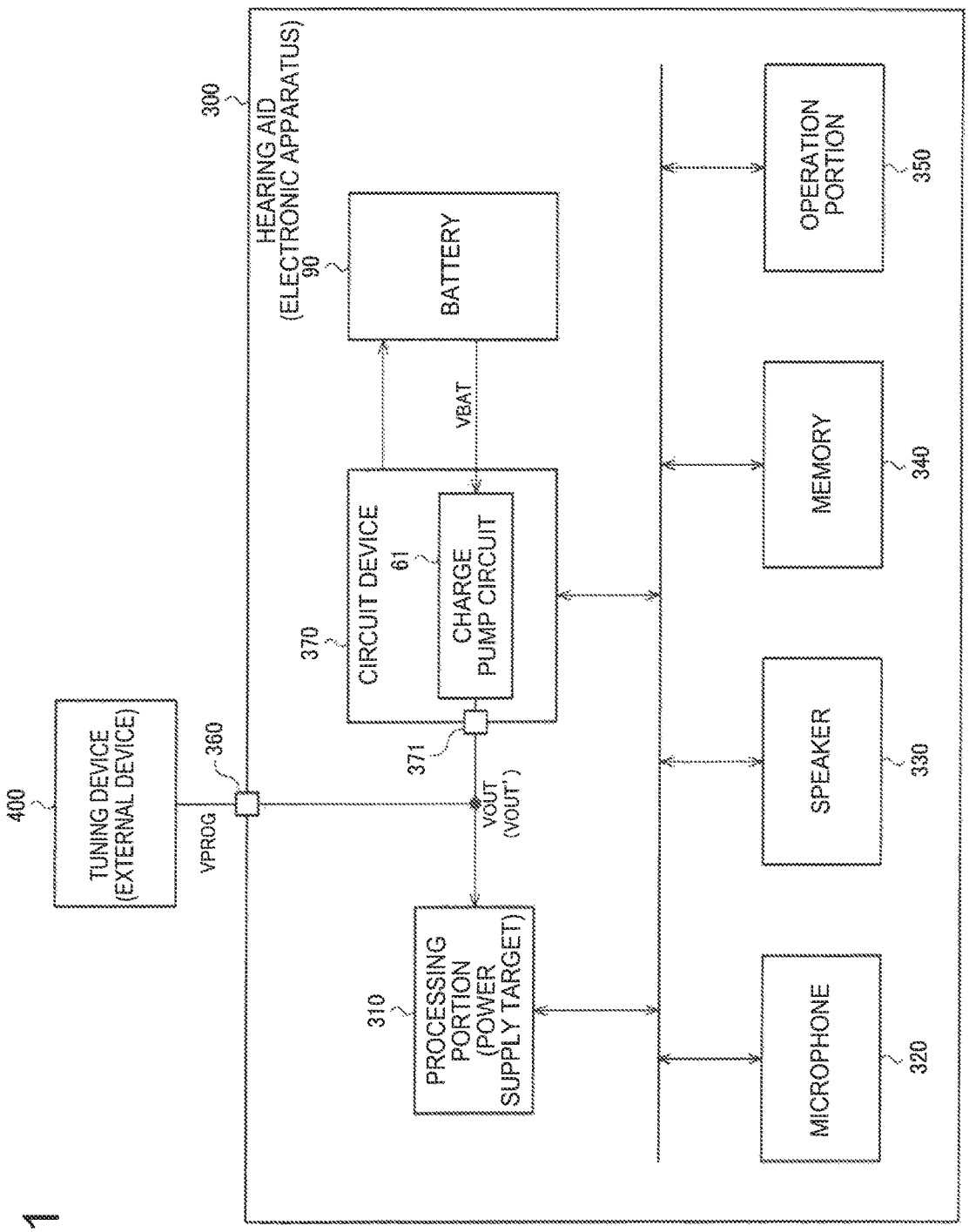
FIG. 1 is an exemplary configuration of a hearing aid (electronic apparatus) including a circuit device of a present embodiment.

FIG. 1 is an exemplary configuration of a hearing aid (electronic apparatus) including a circuit device of the present embodiment. A hearing aid 300 in FIG. 1 includes a processing portion 310 (processing circuit, power supply target), a circuit device 370, a battery 90 (secondary battery), a microphone 320, a speaker 330, a memory 340 (storage device), an operation portion 350 (operation device), and a connection portion 360 (interface).

The circuit device 370 charges the battery 90 based on power supplied from outside of the hearing aid 300. For example, power is supplied to the circuit device 370 through wired or contactless power transmission. Also, the circuit device 370 includes a charge pump circuit 61, and the charge pump circuit 61 steps down an output voltage VBAT (battery voltage) of the battery 90, and supplies a voltage VOUT to the processing portion 310. The circuit device 370 can be realized by an integrated circuit device (IC) or the like.

The microphone 320 converts sound that is input to the hearing aid 300 to an electric signal. The processing portion 310 performs signal processing (amplification processing and filtering processing, for example) on the electric signal from the microphone 320, and outputs the processed signal to the speaker 330. The speaker 330 converts the signal from the processing portion 310 to sound. In this way, sound that has undergone signal processing such as amplification is provided to a user.

Note that the memory 340 stores setting information of the hearing aid 300, for example, or functions as a working memory of the processing portion 310. For example, the memory 340 is a RAM or a nonvolatile memory (such as EEPROM). The operation portion 350 receives operational inputs made by a doctor or a user, and is a button, a switch, or the like, for example. The processing portion 310 is an analog processing circuit, a digital processing circuit, or a combination thereof, for example. The processing portion 310 is a DSP, a microcomputer, a CPU, an ASIC, or the like, for example.

In such a hearing aid 300, when a doctor performs tuning so as to match the hearing ability of a patient, the adjustment is performed in a state in which a connection portion 360 of the hearing aid 300 is connected to the tuning device 400. The connection portion 360 is a terminal, a connector, or the like, for example, and is configured such that the tuning device 400 can supply power to the hearing aid 300 and input or receive data from the hearing aid 300. In such a tuning device 400, it is common that a specified voltage VPROG is applied to the processing portion 310 of the hearing aid 300, and tuning is performed under the specified voltage. That is, the state in which the tuning device 400 is connected to the hearing aid 300 is a state in which the voltage VPROG from the tuning device 400 is applied to the output of the charge pump circuit 61.

At this time, it is desirable that the doctor operates the operation portion 350 so as to turn off the charge pump circuit 61. It is not guaranteed that an off operation will be performed, and it is possible that the voltage VPROG is applied to the output (terminal 371) of the charge pump circuit 61 in a state in which the charge pump circuit 61 is in operation. The charge pump circuit 61 transfers charges by switching capacitors, therefore there may be a case where a voltage applied to an output side is stepped up, and the stepped up voltage is output from an input side. When such a state is achieved, charging of the battery 90 by the charge pump circuit 61 occurs, but this charging path is different from a normal charging path that is from the circuit device 370 to the battery 90. Therefore, this is not a charging path that is appropriately controlled, and it is possible that an over-voltage or an over-current is input to the battery 90.

Figures 2, 3:
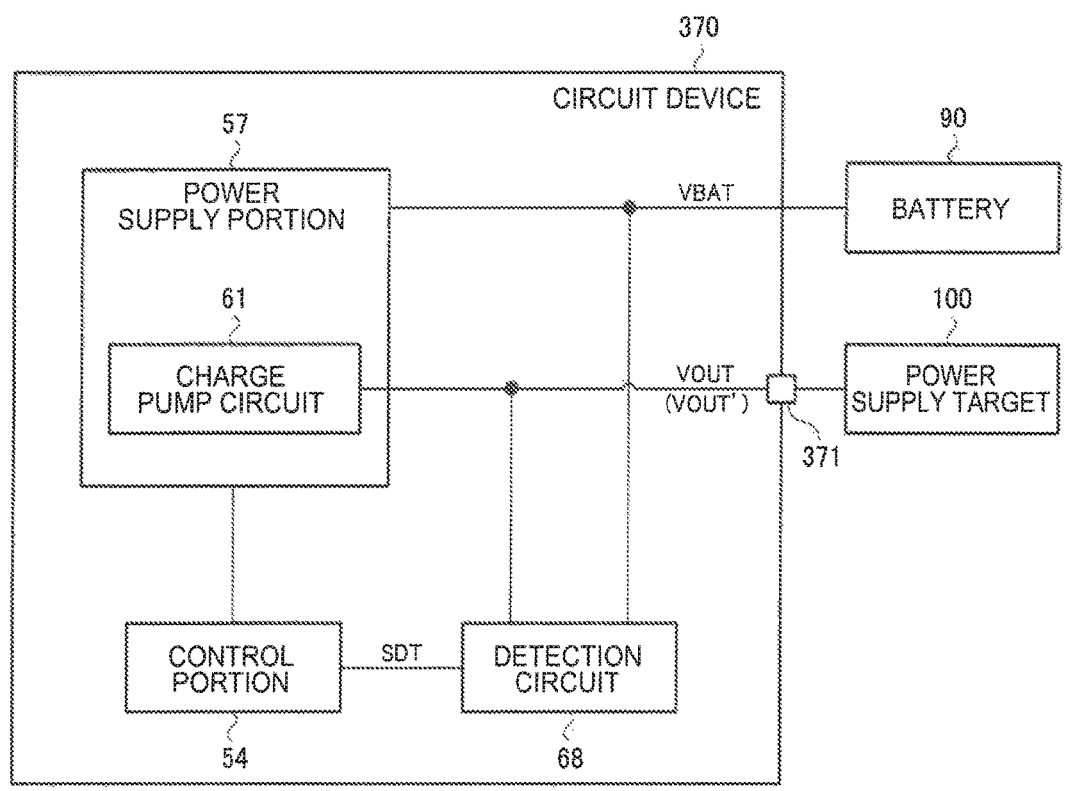
FIG. 2 is an example of an output current of a battery when a tuning device is connected to the hearing aid.
FIG. 3 is an exemplary configuration of the circuit device of the present embodiment.

FIG. 2 is an example of an output current ibat of the battery 90 when the tuning device 400 is connected to the hearing aid 300. An example in which the output voltage of the charge pump circuit 61 is a VOUT=VBAT×(⅓) and a VPROG=1.333V is shown in FIG. 2. The sign of the output current ibat of the battery 90 is positive when a current is output from the battery 90, and is negative when a current is input to the battery 90.

As shown in FIG. 2, in the case where the VBAT is larger than 4.000V, the expression VBAT×(⅓)>1.333V=VPROG holds. In this case, the charge pump circuit 61 transfer charges from the input side to the output side. That is, the ibat is larger than 0 mA and the battery 90 enters a discharging state.

On the other hand, in the case where the VBAT is less than 4.000V, the expression VBAT×(⅓)<1.333V=VPROG holds. In this case, the charge pump circuit 61 transfer charges from the output side to the input side. That is, the charge pump circuit 61 acts as a step-up circuit in which the voltage on the output side is tripled and the stepped up voltage is output to the input side, and supplies a voltage 1.333V×3=4.000V that is higher than the VBAT to a terminal of the battery 90. In this case the ibat is less than 0 mA, and the battery 90 is charged by the current ibat.

For example, in the case where it is possible that the characteristics of the battery 90 deteriorate when the ibat is less than −2 mA, this situation corresponds to the condition in which the VBAT is less than 3.900V in terms of the output voltage of the battery 90. The voltage of the output voltage VBAT of the battery 90 when tuning is performed is not apparent, and there is a possibility that the tuning device 400 is connected when the VBAT is less than 3.900V.

2. Circuit Device

FIG. 3 is an exemplary configuration of a circuit device of the present embodiment that can solve the problem described above. The circuit device 370 in FIG. 3 includes a power supply portion 57 (power supply circuit) that supplies power from the battery 90 to the power supply target 100 and a control portion 54 (control circuit) that controls the power supply portion 57. Also, the circuit device 370 can include a terminal 371 (a terminal connected to an output of the charge pump circuit 61) from which the output voltage VOUT of the charge pump circuit 61 is output. Note that the terminal 371 is a terminal of an integrated circuit device, for example, and corresponds to a pad of a semiconductor chip or a terminal of a package in which a semiconductor chip is packaged.

The power supply portion 57 includes the charge pump circuit 61 that steps down the battery voltage VBAT of the battery 90 to a voltage that is m/n times the battery voltage VBAT, and supplies the stepped down voltage to the power supply target 100 from the terminal 371. Here, n is an integer of one or more, and m is an integer of one or more and (n−1) or less. The control portion 54 stops the charge pump operation of the charge pump circuit 61 when a voltage VOUT' at the terminal 371 satisfies the expression VOUT'>VBAT×m/n.

In the case where the power supply target 100 is connected to the output (terminal 371) of the charge pump circuit 61 and an external voltage is not applied, the voltage of the terminal 371 should be the VOUT' that satisfies the expression VOUT'=VOUT≤VBAT×m/n. That is, as a result of stopping the charge pump operation when the expression VOUT'>VBAT×m/n holds, the charge pump operation can be stopped when an external voltage (VPROG=VOUT in FIG. 1, for example) is applied to the output of the charge pump circuit 61. Also, when the expression VOUT'>VBAT×m/n holds, the voltage at the input node of the charge pump circuit 61 is stepped up to a voltage that is VOUT'×n/m, which is larger than the VBAT, and therefore a voltage that is higher than the battery voltage VBAT is applied to the terminal of the battery 90. According to this patent application, since the charge pump operation can be stopped in such a case, application of an over-voltage or an over-current to the terminal of the battery 90 can be suppressed, and the battery 90 can be protected.

Note that, in the condition "VOUT'>VBAT×m/n", the right side in the inequality, which serves as a comparison voltage, is not limited to VBAT×m/n, and the comparison voltage may be higher than a voltage that is VBAT×m/n. For example, the charge pump operation may be stopped when the expression VOUT'>KS×VBAT×m/n holds, where KS is a coefficient of one or more. For example, in the case where VBAT=3.9000V is used as the boundary, as described in FIG. 2, KS is approximately 1.025.

Here, the charge pump operation refers to an operation in which voltage conversion (charge transfer) is performed by switching the connection of capacitors in the charge pump circuit. That is, the stoppage of the charge pump operation is to stop the operation in which connection of capacitors is switched so as to stop voltage conversion (charge transfer).

Also, the circuit device 370 of the present embodiment includes a detection circuit 68 to which the battery voltage VBAT and the voltage VOUT at the terminal 371 are input and that outputs a detection signal SDT that becomes active when the expression VOUT'>VBAT×m/n holds. The control portion 54 stops the charge pump operation of the charge pump circuit 61 when the detection signal SDT becomes active (first logic level).

In this way, the detection circuit 68 can detect whether or not the expression VOUT'>VBAT×m/n holds based on the battery voltage VBAT and the voltage VOUT at the terminal 371. The charge pump operation can be stopped based on the detection signal SDT, which is the detection result.

Also, in the present embodiment, when the expression VOUT'>VBAT×m/n holds, the control portion 54 inactivates a switching signal for the charge pump transistors included in the charge pump circuit 61 so as to stop the charge pump operation.

As a result of inactivating the switching signal, switching of the capacitors is stopped, and thus the voltage conversion by the charge pump circuit 61 can be stopped. Accordingly, the charging path from the charge pump circuit 61 to the battery 90 is cut off, and the battery 90 can be protected.

Here, the charge pump transistors refer to transistors (switching elements, in a broad sense) that switch connection of the capacitors in the charge pump circuit 61. For example, in the charge pump circuit which will be described later in FIGS. 5A and 5B, transistors constituting switching elements SB1 to SB7 correspond to the charge pump transistors. The switching signal is a signal that controls on and off of the charge pump transistors. "To inactivate the switching signal" is to fix the logic level of the switching signal to high or low so as to stop switching of the logic level.

Also, in the present embodiment, the control portion 54 restarts the charge pump operation that has been stopped when a predetermined restart condition is satisfied.

In this way, when the expression VOUT'>VBAT×m/n holds, the charge pump operation that has been stopped once can be restarted when a predetermined restart condition is satisfied. For example, in the example of the hearing aid described above, in the case where the tuning is finished and a predetermined restart condition has been satisfied, the charge pump operation can be restarted so as to restart the supply of power to the processing portion 310.

For example, the control portion 54 restarts the charge pump operation that has been stopped when predetermined operation information is input to an operation portion (such as the operation portion 350 of the hearing aid 300) of an electronic apparatus that includes the circuit device 370.

In this way, when a user or the like performs a predetermined operation after the expression VOUT'>VBAT×m/n no longer holds (that is, voltage is no longer applied to the output of the charge pump circuit 61), the charge pump operation can be restarted. For example, in the case where the operation portion is a switch portion (switch, button), when a predetermined operation (such as pressing the switch portion for a predetermined length of time, for example) is performed on the switch portion, the charge pump operation can be restarted.

Alternatively, the control portion 54 may cause the charge pump circuit 61 to perform (restart) the charge pump operation when the detection signal SDT is inactivated (second logic level).

In this way, when the expression VOUT'>VBAT×m/n no longer holds (that is, voltage is no longer applied to the output of the charge pump circuit 61), the charge pump operation is automatically restarted, and power is supplied to the power supply target 100. Accordingly, at the time of tuning, operations of the hearing aid can be restarted after tuning without the user performing a special operation, while protecting the battery 90.

Also, in the present embodiment, as will be described later in FIG. 8 or the like, the power supply portion 57 may include a charging portion 58 (charging circuit) and a discharging portion 60 (discharging circuit). The charging portion 58 supplies power to the battery 90 so as to charge the battery 90. The discharging portion 60 includes the charge pump circuit 61, and performs a discharging operation in which power charged to the battery 90 is supplied to the power supply target 100.

In such a configuration, the charging portion 58 applies a current or a voltage to the terminal of the battery 90 when charging is performed, and the discharging portion 60 supplies power from the terminal of the battery 90 to the power supply target 100 when discharging is performed. That is, in the case where a voltage or a current is output from the discharging portion 60 to the terminal of the battery 90, the battery 90 is charged through a path that is different from the charging path from the charging portion 58. In the present embodiment, charging of the battery 90 through a charging path that is not controlled by the charging portion 58 can be prevented.

Also, the circuit device of the present embodiment may be a control device 50 (circuit device) of a power receiving device 40 in a contactless power transmission system, as will be described later in FIG. 6 and thereafter. Note that the application of the circuit device in the present embodiment is not limited to this case, and the circuit device can be applied to an electronic apparatus other than the power receiving device 40.

In the case where the circuit device of the present embodiment is applied to the power receiving device 40, the power supply portion 57 supplies power that has been received by a power receiving portion 52 through contactless power transmission to the battery 90 so as to charge the battery 90.

In this way, the battery 90 can be charged by the power supplied through contactless power transmission, and the power charged to the battery 90 can be supplied to the power supply target 100. In contactless power transmission, when a predetermined condition is satisfied, that is, in the case where the power receiving device 40 is landed (approached) to the power transmitting device 10, for example, power transmission is enabled. When the predetermined condition is no longer satisfied, that is, in the case where the power receiving device 40 is removed from the power transmitting device 10, for example, power transmission is stopped. This removal may possibly be performed at an arbitrary timing of the user, and the battery voltage VBAT at the time is uncertain. In the present embodiment, even in a case where a voltage is applied to the output of the charge pump circuit 61 in a state in which the battery voltage VBAT is uncertain, the battery 90 can be protected.

Also, in the case where the circuit device of the present embodiment is applied to the power receiving device 40, the control portion 54 stops the discharging operation of the discharging portion 60 when landing is detected, and causes the discharging portion 60 to perform the discharging operation in a removed period.

In the case where the discharging portion 60 is caused to perform the discharging operation in the removed period in this way, when the power receiving device 40 is removed from the power transmitting device 10, power supply from the battery 90 to the power supply target 100 is started. For example, in the example of the hearing aid described above, the hearing aid is in a state in which power supply is essentially turned on before tuning. Therefore, it is possible that the tuning device 400 is connected to the hearing aid 300 whose power supply (charge pump operation) has not been turned off due to an operation being forgotten or the like. In the present embodiment, even in a case where such connection is performed, the battery 90 can be protected.

Also, in the case where the circuit device of the present embodiment is applied to the power receiving device 40, the control portion 54 starts the discharging operation of the discharging portion 60 after a start-up period has elapsed, the start-up period being initiated by a decrease in an output voltage VCC (rectification voltage) of the power receiving portion 52.

Specifically, the control portion 54 starts the discharging operation of the discharging portion 60 (C8 in FIG. 11) after the start-up period (TST in FIG. 11) has elapsed from when the output voltage VCC of the power receiving portion 52 decreased below a judgement voltage (C4 in FIG. 11).

In this way, the discharging portion 60 is caused to perform the discharging operation in the removed period, as described above. Even in a case where the tuning device 400 is connected to the hearing aid 300 in this state, the battery 90 can be protected.

Also, even if the output voltage VCC of the power receiving portion 52 decreases, the discharging operation of the battery 90 is not performed unless the start-up period TST of the discharging operation has elapsed. When the start-up period TST has elapsed, power from the battery 90 is discharged, and the power is supplied to the power supply target 100. In this way, a situation in which the battery 90 is unnecessarily discharged, and recharging is performed more than is necessary can be suppressed. Therefore, deterioration in characteristics or the like of the battery 90 due to recharging can be suppressed. Also, power saving can also be realized as a result of the battery 90 not unnecessarily discharging power.

Also, in the case where the circuit device of the present embodiment is applied to the power receiving device 40, the control portion 54 may switch the discharging operation from on to off, or from off to on, based on a result of monitoring an operation state of a switch portion 514 (a switch, a button, or an operation portion, in a broad sense), in the removed period in which the power receiving device 40 is removed from the power transmitting device 10. In this case, the control device 50 (circuit device) may include an unshown monitoring portion that monitors the operation state of the switch.

In this way, the discharging operation (charge pump operation) can be switched from on to off, or from off to on, according to the operation state of the switch portion. For example, when an operation in which the switch portion 514 continues to be pressed for a predetermined time is performed, the discharging operation (charge pump operation) is switched from on to off, or from off to on. Although it is possible that the discharging operation is turned off by operating the switch portion 514 when tuning of the hearing aid 300 is performed, this procedure is not necessarily observed. In the present embodiment, even in a case where the off operation made by using the switch portion 514 is not performed when tuning is performed, the battery 90 can be protected.

3. Detection Circuit

Figure 4:
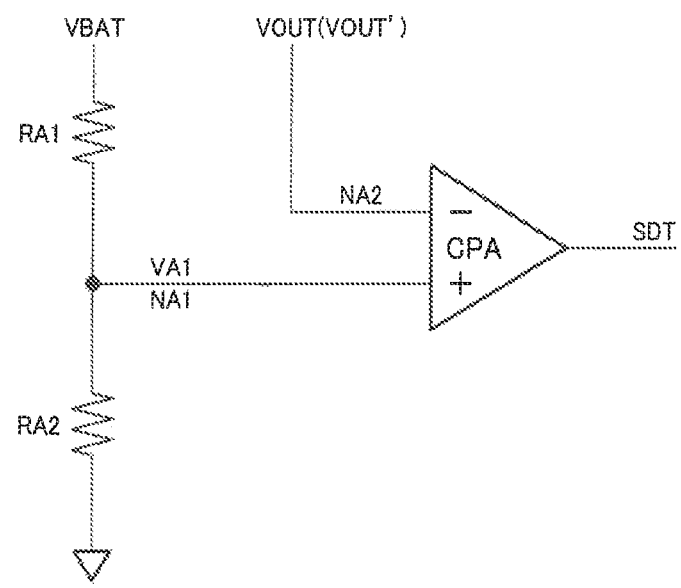
FIG. 4 is a detailed exemplary configuration of a detection circuit.

A detailed exemplary configuration of the detection circuit 68 is shown in FIG. 4. The detection circuit 68 includes, a comparator CPA (voltage comparator circuit), and resistors RA1 and RA2.

The resistors RA1 and RA2 are connected in series, the voltage between the battery voltage VBAT and a reference voltage (a low potential side power supply voltage or a ground voltage, for example) is resistance-divided, and the divided voltage VA1 is output to a node NA1. The node NA1 is a first input node (positive input node) of a comparator CPA. The voltage VOUT' (the output voltage VOUT of the charge pump circuit 61 when an external voltage such as VPROG is not applied) at the terminal 371 is input to a second input node NA2 (negative input node) of the comparator CPA.

The resistance ratio of the resistors RA1 and RA2 is set such that the expression VA1=KS×VBAT×m/n holds, VA1 being the divided voltage. When the expression VOUT'>KS×VBAT×m/n holds, the comparator CPA outputs a detection signal SDT at a low level (active). On the other hand, when the expression VOUT'<KS×VBAT×m/n holds, the comparator CPA outputs the detection signal SDT at a high level (inactive).

4. Charge Pump Circuit

Figure 5A:
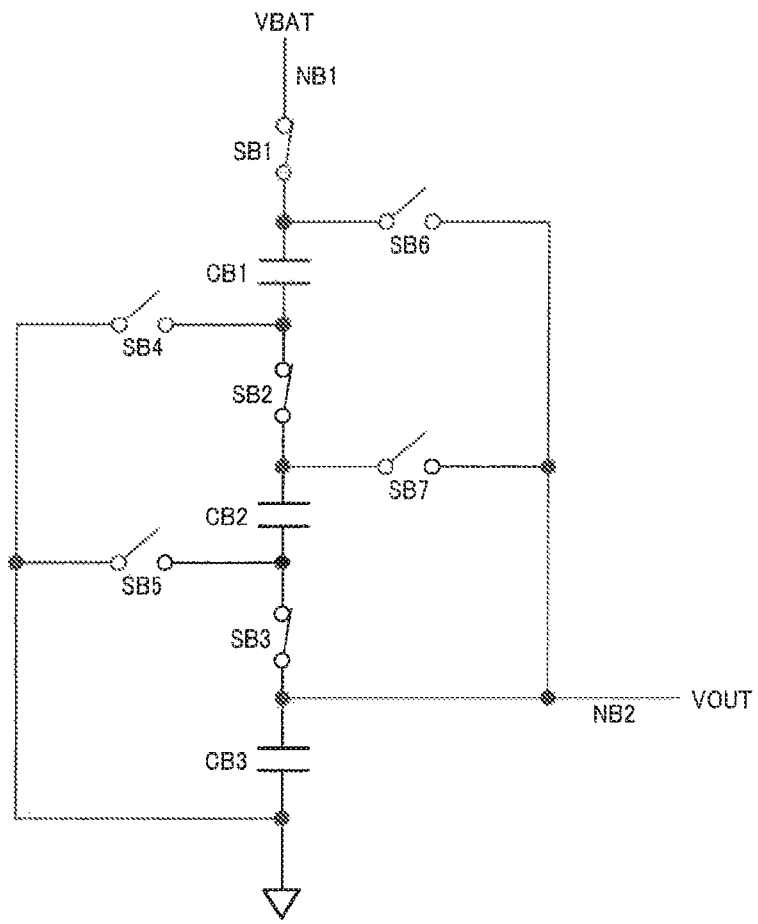
FIG. 5A is a detailed exemplary configuration of a charge pump circuit.
Figure 5B:
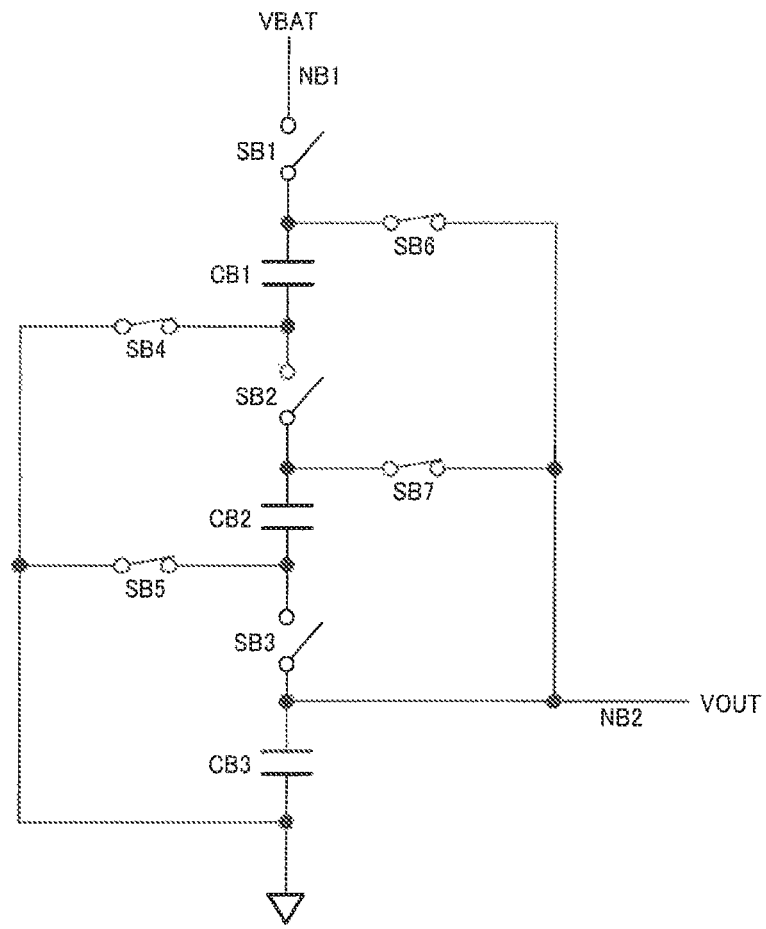
FIG. 5B is a detailed exemplary configuration of the charge pump circuit.

A detailed exemplary configuration of the charge pump circuit 61 is shown in FIGS. 5A and 5B. A switching state in a first phase is shown in FIG. 5A, and a switching state in a second phase is shown in FIG. 5B. Note that, here, an exemplary configuration of a charge pump circuit that steps down an input voltage to a voltage that is one third of the input voltage will be described, but the step-down ratio of the charge pump circuit is not limited to one third.

The charge pump circuit 61 includes capacitors CB1 to CB3 and switching elements SB1 to SB7. The capacitances of the capacitors CB1 to CB3 are the same (approximately the same). The switching elements SB1 to SB7 can be constituted by transistors, for example. A signal for controlling on and off of the switching elements SB1 to SB7 is supplied from the control portion 54.

In the first phase in FIG. 5A, the switching elements SB1 to SB3 are turned on and the switching elements SB4 to SB7 are turned off. The capacitors CB1 to CB3 are connected in series between a node NB1 of the battery voltage VBAT and a node of the reference voltage. A voltage that is VBAT×(⅓) is applied to each capacitor, and charges are accumulated in accordance with the applied voltage.

In the second phase in FIG. 5B, the switching elements SB1 to SB3 are turned off and the switching elements SB4 to SB7 are turned on. The capacitors CB1 to CB3 are connected in parallel between a node NB2 of an output voltage VOUT and the node of the reference voltage. Then, the voltage VBAT×(⅓) that has been charged to each capacitor in the first phase is output as the output voltage VOUT.

It is assumed that the voltage VPROG is applied to the output node NB2 from the tuning device 400, and the voltage VOUT' at the output node NB2 (voltage at the terminal 371) satisfies the expression VOUT'=VPROG>VBAT×(⅓). In this case, the voltage VOUT'=VPROG is applied to each capacitor in the second phase, and charges are accumulated in accordance with the applied voltage. Then, in the first phase, a voltage that is three times the VOUT' is output to the input node NB1, where the expression VOUT'×3=VPROG×3>VBAT holds. The charge pump circuit 61 only transfers charges between the input node NB1 and the output node NB2, and thus there are cases where a voltage that is higher than the input voltage (battery voltage VBAT) is output to the input node NB1. In the present embodiment, the charge pump operation can be stopped in such a case, and the battery 90 can be protected.

5. Contactless Power Transmission System

Hereinafter, details of the circuit device and an electronic apparatus including the circuit device will be described, taking, as an example, a case in which the circuit device of the present embodiment is applied to a power receiving device in a contactless power transmission system.

Figure 6A:
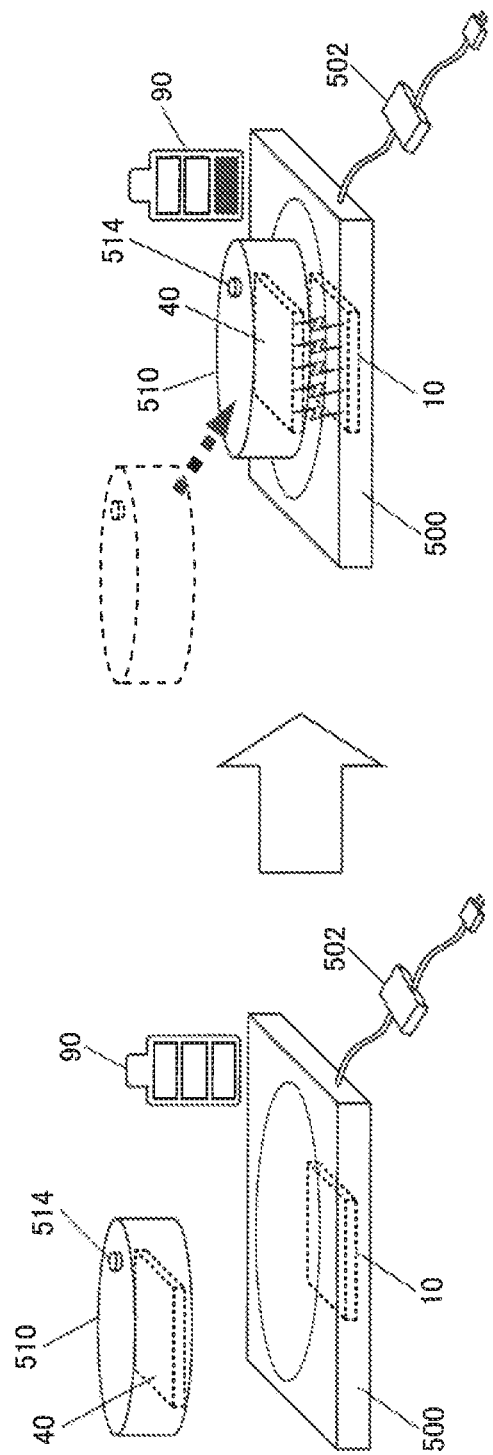
FIG. 6A is a diagram for describing a contactless power transmission system of the present embodiment.

An example of a contactless power transmission system of the present embodiment is shown in FIG. 6A. A charger 500 (one of electronic apparatuses) includes a power transmitting device 10. An electronic apparatus 510 includes a power receiving device 40. Also, the electronic apparatus 510 includes an operation switch portion 514 (an operation portion, in a broad sense) and a battery 90. Note that, although the battery 90 is schematically illustrated in FIG. 6A, the battery 90 is, in actuality, incorporated in the electronic apparatus 510. The contactless power transmission system of the present embodiment is constituted by the power transmitting device 10 and the power receiving device 40 in FIG. 6A.

Power is supplied to the charger 500 via a power supply adapter 502, and this power is transmitted by contactless power transmission from the power transmitting device 10 to the power receiving device 40. Accordingly, the battery 90 in the electronic apparatus 510 can be charged and allow a device in the electronic apparatus 510 to operate.

Note that a power supply of the charger 500 may be a power supply using a USB (USB cable). Also, various apparatuses can be envisioned as the electronic apparatus 510 to which the present embodiment is applied. For example, various electronic apparatuses can be envisioned such as a hearing aid, a watch, a biological information measuring device (wearable apparatus for measuring a pulse wave or the like), a mobile information terminal (such as a smartphone or a cellular phone), a cordless telephone, a shaver, an electric toothbrush, a wrist computer, a handy terminal, an onboard apparatus, a hybrid car, an electric car, an electric motorcycle, and an electric bicycle. For example, a control device (such as a power receiving device) of the present embodiment can be incorporated into various moving bodies such as a car, an airplane, a motorcycle, a bicycle, and a marine vessel. The moving bodies are apparatuses and devices that include drive mechanisms such as a motor and an engine, steering mechanisms such as a steering wheel and a rudder, and various electronic apparatuses (onboard apparatuses), and travel on the ground, through the air, and on the sea, for example.

Figure 6B:
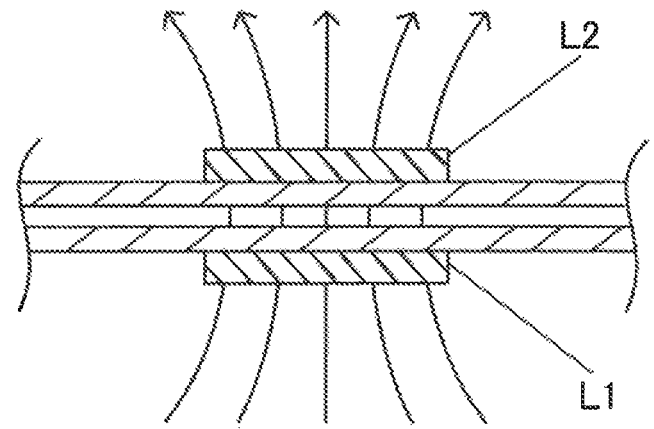
FIG. 6B is a diagram for describing the contactless power transmission system of the present embodiment.

As schematically shown in FIG. 6B, power transmission from the power transmitting device 10 to the power receiving device 40 is realized as a result of forming a power transmission transformer by electromagnetically coupling a primary coil L1 (power transmitting coil) provided on a power transmitting side and a secondary coil L2 (power receiving coil) provided on a power receiving side, or the like. Accordingly, contactless power transmission is made possible. Note that various methods such as an electromagnetic induction method and a magnetic field resonance method can be adopted as the contactless power transmission method.

Figure 7:
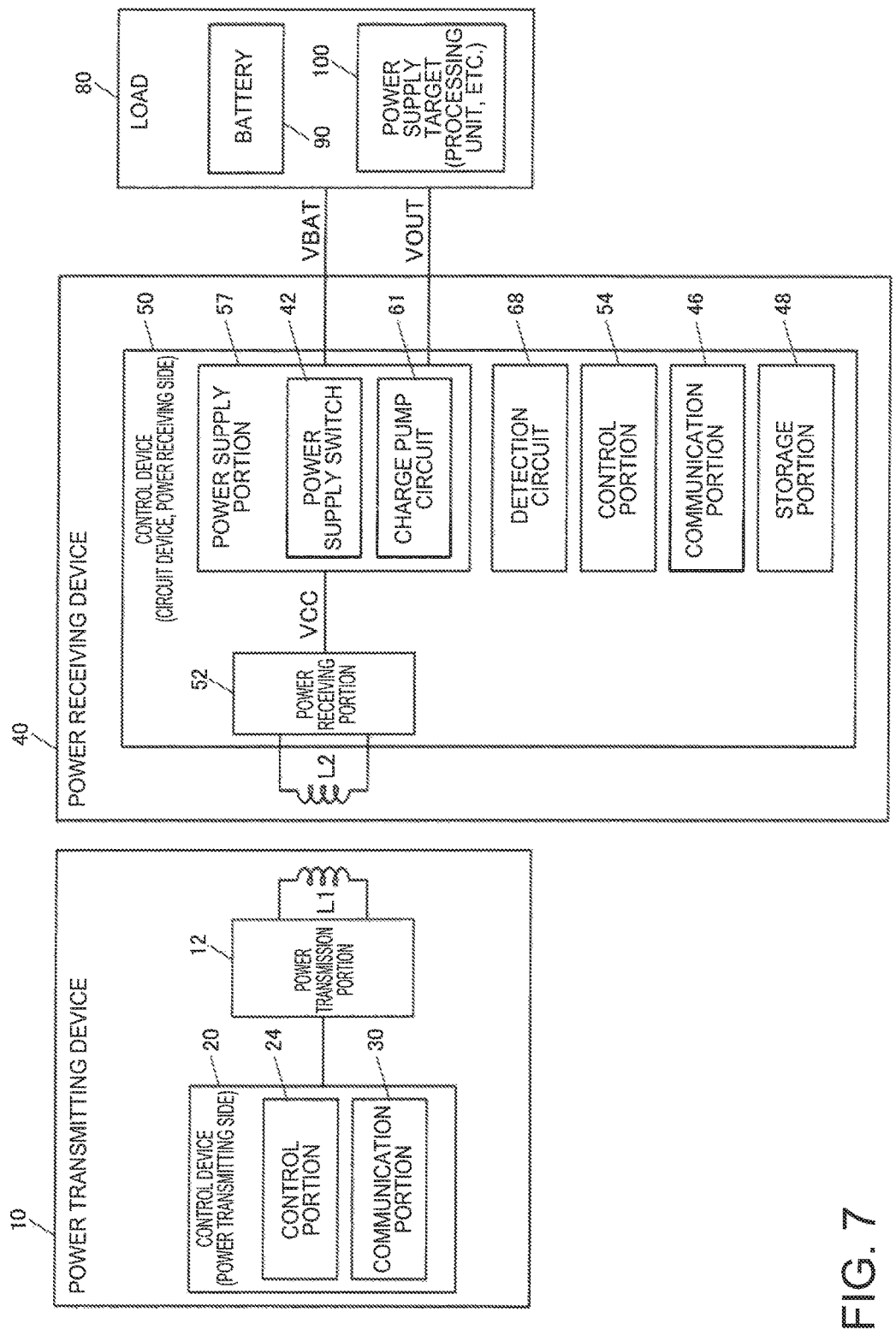
FIG. 7 is an exemplary configuration of the control device, the power transmitting device, and the power receiving device of the present embodiment.

6. Configurations of Power Transmitting Device, Power Receiving Device, and Control Device An exemplary configuration of control devices 20 and 50 of the present embodiment and the power transmitting device 10 and the power receiving device 40 that respectively includes the control devices 20 and 50 is shown in FIG. 7. The control device 50 on the power receiving side corresponds to the circuit device 370 in FIG. 3. Note that the configuration of these devices is not limited to the configuration in FIG. 7, and various modifications can be implemented such as omitting a portion of the constituent elements, adding another constituent element (a reporting portion, for example), or changing a connection relationship.

The electronic apparatus on the power transmitting side such as the charger 500 in FIG. 6A includes the power transmitting device 10. Also, the electronic apparatus 510 on the power receiving side includes the power receiving device 40 and a load 80. The load 80 can include the battery 90 and a power supply target 100. The power supply target 100 can be various devices such as a processing unit (such as DSP). According to the configuration in FIG. 7, a contactless power transmission (wireless power transfer) system is realized in which power is transmitted from the power transmitting device 10 to the power receiving device 40 by electromagnetically coupling the primary coil L1 and the secondary coil L2.

The power transmitting device 10 (transmission module, primary module) includes the primary coil L1, a power transmission portion 12 (power transmission circuit), and the control device 20. When power is to be transmitted, the power transmission portion 12 generates an AC voltage of a predetermined frequency and supplies the voltage to the primary coil L1. The power transmission portion 12 can include a power transmission driver that drives the primary coil L1, a power supply circuit (a power supply voltage control portion, for example) that supplies power to the power transmission driver, and at least one capacitor that constitutes a resonance circuit with the primary coil L1.

A power transmission transformer is formed when the primary coil L1 (transmission side coil) is electromagnetically coupled to the secondary coil L2 (receiving side coil). For example, when power transmission is needed, the electronic apparatus 510 is placed on the charger 500 so as to be in a state in which a magnetic flux of the primary coil L1 passes through the secondary coil L2, as shown in FIGS. 6A and 6B. On the other hand, when power transmission is not needed, the electronic apparatus 510 is physically separated from the charger 500 so as to be in a state in which the magnetic flux of the primary coil L1 does not pass through the secondary coil L2.

The control device 20 performs various types of control on the power transmitting side, and can be realized by an integrated circuit device (IC) or the like. The control device 20 includes a control portion 24 (control circuit) and a communication portion 30 (communication circuit). Note that a modification in which the power transmission portion 12 is incorporated in the control device 20 or the like can be implemented.

The control portion 24 executes various types of control processing of the power transmitting side control device 20. For example, the control portion 24 controls the power transmission portion 12 and the communication portion 30. Specifically, the control portion 24 performs various types of sequence control and judgement processing necessary for power transmission, communication processing, and the like. The control portion 24 can be realized by a logic circuit such as a gate array that is generated by an automated place-and-route method, or various processors such as a microcomputer, for example.

The communication portion 30 performs communication processing for the communication of communication data with the power receiving device 40. For example, the communication portion 30 performs processing for detecting and receiving communication data from the power receiving device 40.

The power receiving device 40 (power receiving module, secondary module) includes the secondary coil L2 and the control device 50. The control device 50 (circuit device) performs various types of control on the power receiving side, and can be realized by an integrated circuit device (IC) or the like. The control device 50 includes a power receiving portion 52 (power receiving circuit), a control portion 54

(control circuit), a power supply portion 57 (power supply circuit), and the detection circuit 68. Also, the control device 50 can include a communication portion 46 (communication circuit) and a storage portion 48 (memory). Note that a modification in which the power receiving portion 52 is provided external to the control device 50 or the like can be implemented.

The power receiving portion 52 receives power from the power transmitting device 10. Specifically, the power receiving portion 52 converts an AC voltage induced in the secondary coil L2 to a DC rectified voltage VCC, and outputs the rectified voltage VCC.

The power supply portion 57 supplies power to the load 80 based on the power received by the power receiving portion 52. For example, the power supply portion 57 charges the battery 90 by supplying power received by the power receiving portion 52. Alternatively, the power supply portion 57 supplies power from the battery 90 or power received by the power receiving portion 52 to the power supply target 100. The power supply portion 57 includes a power supply switch 42 and the charge pump circuit 61. The power supply switch 42 is a switch (switching element, switch circuit) for supplying power received by the power receiving portion 52 to the load 80. For example, the power supply switch 42 charges the battery 90, which is the load 80, by supplying power received by the power receiving portion 52 to the battery 90.

The control portion 54 performs various types of control processing of the control device 50 on the power receiving side. For example, the control portion 54 controls the communication portion 46 and the power supply portion 57. Also, the control portion 54 can control the power receiving portion 52 and the storage portion 48. The control portion 54 can be realized by a logic circuit such as a gate array that is generated by an automated place-and-route method, or various processors such as a microcomputer, for example.

The communication portion 46 performs communication in which communication data is transmitted to the power transmitting device 10. Alternatively, the communication portion 46 may perform communication in which communication data is received from the power transmitting device 10. The communication performed by the communication portion 46 can be realized by load modulation, for example. Note that the communication method used by the communication portion 46 is not limited to load modulation. For example, the communication portion 46 may perform communication using the primary coil L1 and the secondary coil L2 with a method other than load modulation. Alternatively, a coil that is different from the primary coil L1 and the secondary coil L2 is provided, and communication may be performed with a communication method, namely load modulation or the like, using this different coil. Alternatively, communication may be performed by proximity wireless communication using RE or the like.

The storage portion 48 stores various types of information. The storage portion 48 can be realized by a nonvolatile memory, for example, but is not limited thereto. For example, the storage portion 48 may be realized by a memory (ROM, for example) other than a nonvolatile memory. Alternatively, the storage portion 48 may be realized by a circuit using a fuse element, or the like.

The load 80 includes the battery 90 and the power supply target 100. The battery 90 is, for example, a rechargeable secondary battery, and is a lithium battery (such as a lithium ion secondary battery or a lithium ion polymer secondary battery), a nickel battery (such as a nickel-hydrogen storage battery or a nickel-cadmium storage battery), or the like. The power supply target 100 is a device (integrated circuit device) such as a processing unit (DSP, microcomputer) that is provided in the electronic apparatus 510 (FIG. 6A) in which the power receiving device 40 is incorporated, and is a power supply target of the battery 90, for example. Note that the power received by the power receiving portion 52 may be directly supplied to the power supply target 100.

7. Detailed Exemplary Configuration of Power Transmitting Device, Power Receiving Device, and Control Device A detailed exemplary configuration of the control devices 20 and 50 of the present embodiment and the power transmitting device 10 and the power receiving device 40 including the same is shown in FIG. 8. The control device 50 on the power receiving side corresponds to the circuit device 370 in FIG. 3. Note that a detailed description of configurations of FIG. 8 that are similar to those of FIG. 7 will be omitted.

Figure 8:
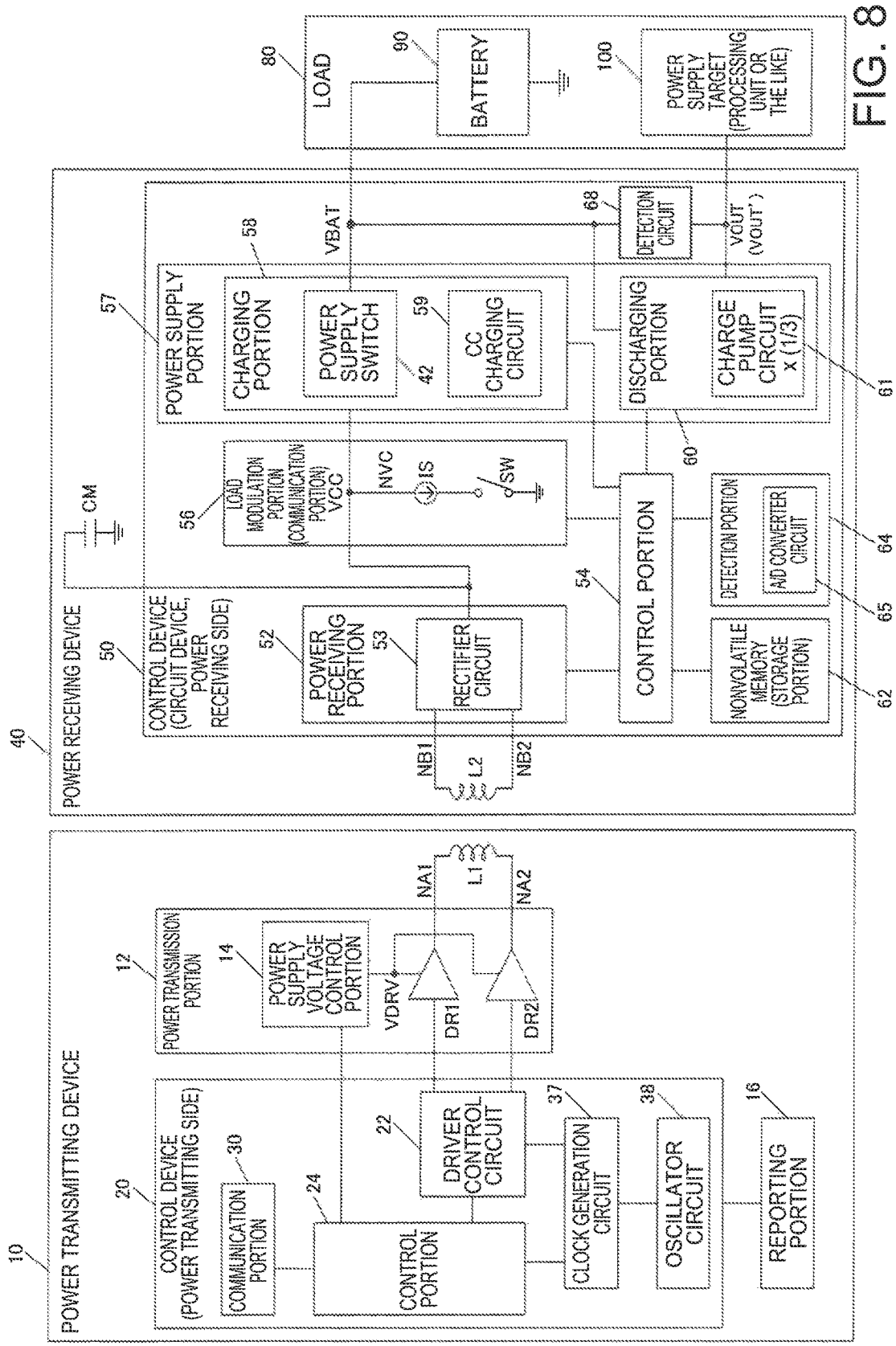
FIG. 8 is a detailed exemplary configuration of the control device, the power transmitting device, and the power receiving device of the present embodiment.

In FIG. 8, the power transmission portion 12 includes a first transmission driver DR1 that drives one end of the primary coil L1, a second transmission driver DR2 that drives the other end of the primary coil L1, and a power supply voltage control portion 14 (power supply voltage control circuit). Each of the transmission drivers DR1 and DR2 is realized by an inverter circuit (buffer circuit) or the like that is constituted by a power MOS transistor, for example. These transmission drivers DR1 and DR2 are controlled (driven) by a driver control circuit 22 in the control device 20. That is, the control portion 24 controls the power transmission portion 12 via the driver control circuit 22.

The power supply voltage control portion 14 controls a power supply voltage VDRV of the power transmission drivers DR1 and DR2. For example, a control portion 24 controls the power supply voltage control portion 14 based on communication data (transmitting power setting information) received from the power receiving side. Accordingly, the power supply voltage VDRV supplied to the power transmission drivers DR1 and DR2 is controlled, and variable control of the transmitting power is realized, for example. The power supply voltage control portion 14 can be realized by a DC/DC converter or the like. For example, the power supply voltage control portion 14 performs a step-up operation on the power supply voltage (5 V, for example) from the power supply, generates a power supply voltage VDRV (6 V to 15 V, for example) for the power transmission drivers, and supplies the power supply voltage VDRV to the power transmission drivers DR1 and DR2. Specifically, when increasing the transmitting power from the power transmitting device 10 to the power receiving device 40, the power supply voltage control portion 14 increases the power supply voltage VDRV that is supplied to the power transmission drivers DR1 and DR2, and when decreasing the transmitting power, the power supply voltage control portion 14 decreases the power supply voltage VDRV.

A reporting portion 16 (a reporting device, and is a display portion (display device), for example) reports (displays) various states (being in power transmission, ID authentication or the like) of the contactless power transmission system using light, sound, an image or the like, and is realized by an LED, a buzzer, an LCD or the like, for example.

The power transmitting side control device 20 includes the driver control circuit 22, the control portion 24, the communication portion 30, a clock generation circuit 37, and an oscillator circuit 38. The driver control circuit 22 (pre-driver) controls the transmission drivers DR1 and DR2.

For example, the driver control circuit 22 outputs a control signal (drive signal) to the gates of transistors that constitute the power transmission drivers DR1 and DR2, and causes the power transmission drivers DR1 and DR2 to drive the primary coil L1. The oscillator circuit 38 is constituted by a crystal-oscillator circuit or the like, and generates a clock signal for the primary side. The clock generation circuit 37 generates a drive clock signal that defines a power transmission frequency (drive frequency), or the like. Also, the driver control circuit 22 generates a control signal having a given frequency (power transmission frequency), based on the drive clock signal and the control signal from the control portion 24, and outputs the control signal to the power transmission drivers DR1 and DR2 in the power transmission portion 12 for control.

The control device 50 (control device) on the power receiving side includes the power receiving portion 52, the control portion 54, a load modulation portion 56 (load modulation circuit), the power supply portion 57, a nonvolatile memory 62, a detection portion 64 (detection circuit), and a detection circuit 68.

The power receiving portion 52 includes a rectifier circuit 53 constituted by a plurality of transistors and diodes. The rectifier circuit 53 converts an AC induced voltage in the secondary coil L2 to a DC rectified voltage VCC, and outputs the rectified voltage VCC.

The load modulation portion 56 (communication portion, in a broad sense) performs load modulation. For example, the load modulation portion 56 includes a current source IS, and performs load modulation using the current source IS. Specifically, the load modulation portion 56 includes the current source IS (constant current source) and a switching element SW. The current source IS and the switching element SW are provided in series between a node NVC of the rectified voltage VCC and a GND (low potential side power supply voltage, in a broad sense) node, for example. The switching element SW is turned on and off based on a control signal from the control portion 54, for example, and a current (constant current) of the current source IS that flows from the node NVC to GND is caused to flow or be cut off, and thus the load modulation is realized.

Note that one end of a capacitor CM is connected to the node NVC. The capacitor CM is provided as a component external to the control device 50, for example. Also, the switching element SW can be realized by a MOS transistor or the like. The switching element SW may be provided as a portion of the transistors that constitute a circuit of the current source IS. Also, the load modulation portion 56 is not limited to the configuration in FIG. 8, and various modifications such as using a resistor in place of the current source IS can be implemented.

The power supply portion 57 includes a charging portion 58 and a discharging portion 60. The charging portion 58 performs charging of the battery 90 (charging control). For example, the charging portion 58 is supplied with a voltage that is based on the rectified voltage VCC (DC voltage, in a broad sense) from the power receiving portion 52, and charges the battery 90. The charging portion 58 can include a power supply switch 42 and a CC charging circuit 59. The CC charging circuit 59 is a circuit that performs CC (Constant-Current) charging of the battery 90.

The discharging portion 60 performs a discharging operation for discharging the battery 90. For example, the discharging portion 60 performs the discharging operation for discharging the battery 90, and supplies power from the battery 90 to the power supply target 100. For example, the discharging portion 60 is supplied with a battery voltage VBAT from the battery 90, and supplies an output voltage VOUT to the power supply target 100. The discharging portion 60 can include a charge pump circuit 61. The charge pump circuit 61 steps down the battery voltage VBAT (to a third of the input voltage, for example), and supplies the stepped down voltage to the power supply target 100 as the output voltage VOUT (VBAT/3). The discharging portion 60 (charge pump circuit) operates with the battery voltage VBAT, for example, as the power supply voltage.

The nonvolatile memory 62 (storage portion, in a broad sense) is a nonvolatile memory device that stores various types of information. The nonvolatile memory 62 stores various types of information such as status information of the power receiving device 40, for example. An EEPROM or the like can be used as the nonvolatile memory 62. A MONOS (Metal-Oxide-Nitride-Oxide-Silicon) type memory can be used as the EEPROM, for example. A flash memory using a MONOS type memory can be used, for example. Alternatively, other types of memories such as a floating-gate type memory may be used as the EEPROM.

The detection portion 64 performs various detection operations. For example, the detection portion 64 performs various detection operations by monitoring the rectified voltage VCC, the battery voltage VBAT, and the like. Specifically, the detection portion 64 includes an A/D converter circuit 65, performs A/D conversion on voltages based on the rectified voltage VCC and the battery voltage VBAT, a temperature detection voltage from an unshown temperature detection portion, and the like by using the A/D converter circuit 65, and executes a detection operation using the obtained digital A/D converted values. Detection of over-discharge, over-voltage, over-current, and abnormal temperature (high temperature, low temperature) are envisioned as detection operations performed by the detection portion 64.

In FIG. 8, the load modulation portion 56 starts load modulation when the output voltage VCC of the power receiving portion 52 becomes higher than the first voltage (VST) and landing is detected, and stops the load modulation when removal is detected. Specifically, the load modulation portion 56 starts the load modulation when landing of the electronic apparatus 510 is detected. The power transmitting device 10 (control portion 24) starts normal power transmission with the power transmission portion 12 on the condition that the power receiving device 40 (load modulation portion 56) has started the load modulation. Also, when removal of the electronic apparatus 510 is detected, the load modulation portion 56 stops the load modulation. The power transmitting device 10 (control portion 24) continues the normal power transmission by the power transmission portion 12 while the load modulation continues. That is, when the load modulation is no longer detected, the normal power transmission is caused to stop, and the power transmission portion 12 is caused to perform intermittent power transmission for landing detection, for example. In this case, the control portion 54 on the power receiving side can perform the landing detection and the removal detection based on the output voltage VCC of the power receiving portion 52.

Also, in FIG. 8, the communication portion 46 in FIG. 7 is realized by the load modulation portion 56 that transmits communication data by the load modulation. Specifically, the load modulation portion 56 performs load modulation such that the load modulation pattern constituted by a first load state and a second load state is a first pattern (first bit pattern) for a first logic level ("1", for example) of the communication data (bits of communication data) that is to be transmitted to the power transmitting device 10 (control device 20). On the other hand, the load modulation portion 56 performs load modulation such that the load modulation pattern is a second pattern (second bit pattern) that is different from the first pattern for a second logic level ("0", for example) of the communication data (bits of communication data) that is to be transmitted to the power transmitting device 10.

Meanwhile, the communication portion 30 on the power transmitting side determines that the communication data is communication data of the first logic level if the load modulation pattern is the first pattern. The communication portion 30 determines that the communication data is communication data of the second logic level if the load modulation pattern is the second pattern.

Here, the first pattern is a pattern in which the duration of a period in the first load state is longer than that in the second pattern, for example. For example, the communication portion 30 performs sampling of the load modulation pattern at given sampling intervals from a first sampling point set in a period in the first load state in the first pattern, and takes in communication data having the given number of bits (16 bits or 64 bits, for example).

With a method in which such a load modulation pattern is used, detection sensitivity with respect to the load change by the load modulation and noise immunity in detection can be improved. Accordingly, the first voltage, which is a communication start voltage (load modulation start voltage) can be set to a low voltage. As a result, it becomes possible to start communication upon detecting landing over a large distance range, and the power transmitting side is caused to perform control for charging the battery 90 (transmitting power control, for example).

Also, the power supply portion 57 includes the charging portion 58 that charges the battery 90 based on the power received by the power receiving portion 52, and the discharging portion 60 that performs a discharging operation of the battery 90 and supplies the power from the battery 90 to the power supply target 100.

Also, the control portion 54 (discharging system control portion) stops the discharging operation of the discharging portion 60 when landing is detected. That is, when landing of the electronic apparatus 510 is detected in FIG. 6A, the discharging operation (supply of VOUT) of the discharging portion 60 is stopped, and the power of the battery 90 is not discharged to the power supply target 100. Also, the control portion 54 causes the discharging portion 60 to perform the discharging operation in a removed period (a period in which the electronic apparatus 510 is removed). Due to this discharging operation, the power of the battery 90 is supplied to the power supply target 100 via the discharging portion 60.

8. Operation Sequence of Contactless Power Transmission System

Figure 9:
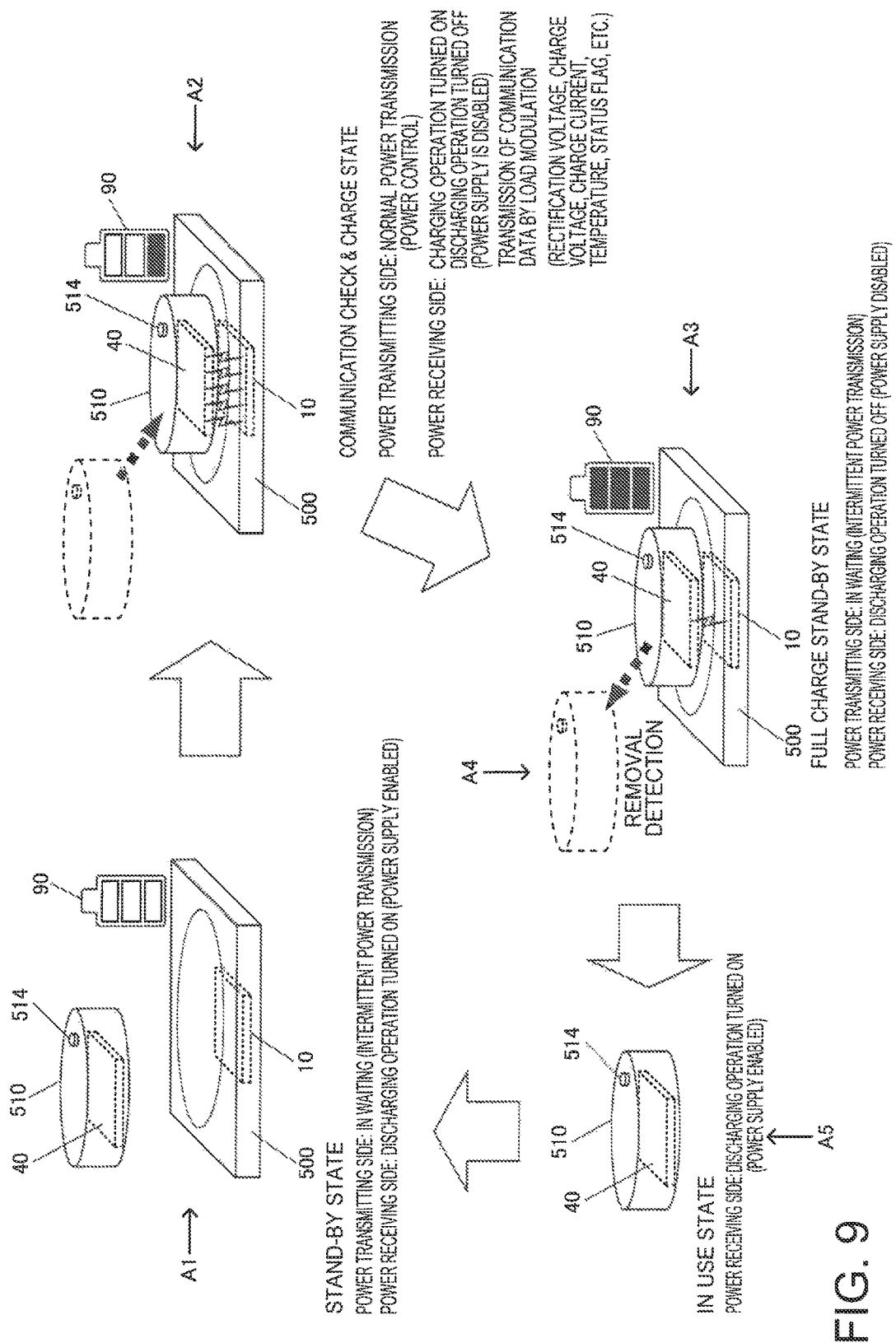
FIG. 9 is a diagram for describing an example of an operation sequence of the contactless power transmission system.

Next, an example of an operation sequence of the contactless power transmission system of the present embodiment will be described. FIG. 9 is a diagram for describing an outline of an operation sequence.

In A1 in FIG. 9, the electronic apparatus 510 including the power receiving device 40 is not placed on the charger 500 including the power transmitting device 10, and is in a removed state. In this case, a stand-by state is realized. In the stand-by state, the power transmission portion 12 in the power transmitting device 10 is in a state in which landing of the electronic apparatus 510 is detected by performing intermittent power transmission for landing detection. Also, in the stand-by state, the discharging operation to the power supply target 100 is turned on in the power receiving device 40, and the power supply to the power supply target 100 is enabled. Accordingly, the power supply target 100 such as a processing unit is supplied with the power from the battery 90, and can operate.

As shown in A2 in FIG. 9, when the electronic apparatus 510 is placed on the charger 500, and landing is detected, a communication check & charge state is realized. In the communication check & charge state, the power transmission portion 12 in the power transmitting device 10 performs normal power transmission which is continuous power transmission. Here, the power transmission portion 12 performs normal power transmission while performing power control in which the power is variably changed depending on the state of power transmission or the like. Also, control based on the charge state of the battery 90 is performed. The power transmission state is a state determined by a positional relationship (distance between coils or the like) between the primary coil L1 and the secondary coil L2 or the like, and can be determined based on information such as the rectified voltage VCC, which is the output voltage from the power receiving portion 52. The charge state of the battery 90 can be determined based on the information such as the battery voltage VBAT.

Also, in the communication check & charge state, the charging operation of the charging portion 58 in the power receiving device 40 is turned on, and charging of the battery 90 is performed based on the power received by the power receiving portion 52. Also, the discharging operation of the discharging portion 60 is turned off, and power from the battery 90 is not supplied to the power supply target 100. Also, in the communication check & charge state, communication data is transmitted to the power transmitting side by load modulation performed by the load modulation portion 56. For example, communication data including power transmission status information (such as VCC), charge status information (such as VBAT and various status flags), and information such as a temperature is transmitted from the power receiving side to the power transmitting side by regular load modulation in a normal power transmission period.

As shown in A3 in FIG. 9, when full charge of the battery 90 is detected, a full charge stand-by state is realized. In the full charge stand-by state, the power transmission portion 12 is in a state in which intermittent power transmission for removal detection is performed so as to detect removal of the electronic apparatus 510. Also, the discharging operation of the discharging portion 60 remains off, and the power supply to the power supply target 100 remains to be disabled.

When removal of the electronic apparatus 510 is detected as shown in A4 in FIG. 9, the electronic apparatus 510 is in a use state, and the discharging operation of the power receiving side is turned on, as shown in A5 in FIG. 9. Specifically, the discharging operation of the discharging portion 60 is switched from off to on, and the power from the battery 90 is supplied to the power supply target 100 via the discharging portion 60. Accordingly, power from the battery 90 is supplied, the power supply target 100 such as a processing unit operates using the power, and the electronic apparatus 510 is in a state in which a user can use it normally.

In the present embodiment, as described above, when landing of the electronic apparatus 510 is detected, normal power transmission is performed, and regular load modulation is performed in the normal power transmission period, as shown in A1 in FIG. 9. Also, when landing is detected, the discharging operation of the discharging portion 60 is stopped. In this regular load modulation, communication data including information for controlling power on the power transmitting side, and information representing the status on the power receiving side are transmitted from the power receiving side to the power transmitting side. For example, by transmitting the information (power transmission status information) for power control, optimum power control based on the positional relationship or the like between the primary coil L1 and the secondary coil L2 can be realized, for example. Also, by transmitting the information representing the status on the power receiving side, an optimum and safe charging environment can be realized. Also, in the present embodiment, normal power transmission continues while the load modulation continues, and the discharging operation of the discharging portion 60 remains off.

Also, in the present embodiment, when full charge of the battery 90 is detected, normal power transmission is stopped, and intermittent power transmission for removal detection is performed, as shown in A3 in FIG. 9. When removal is detected and the removed period begins, the discharging operation of the discharging portion 60 is performed, as shown in A4 and A5 in FIG. 9. Accordingly, power from the battery 90 is supplied to the power supply target 100, and normal operation of the electronic apparatus 510 becomes possible. Note that landing detection and removal detection are performed based on the output voltage VCC of the power receiving portion 52.

In the present embodiment, as described above, the discharging operation for discharge to the power supply target 100 is turned off in a charge period (normal power transmission period) of the battery 90 in the electronic apparatus 510, and therefore a situation in which power is wastefully consumed in the charge period by the power supply target 100 can be suppressed.

When removal of the electronic apparatus 510 is detected, the discharging operation for discharge to the power supply target 100 is turned on along with switching being performed from normal power transmission to intermittent power transmission. As a result of the discharging operation being turned on, power from the battery 90 is supplied to the power supply target 100, and normal operation of the power supply target 100 such as a processing unit (DSP) becomes possible. In this way, an operation sequence of preferable contactless power transmission can be realized in a type of electronic apparatus 510 (electronic apparatus such as a hearing aid or a wearable apparatus that is worn by a user, for example) that does not operate in the charge period during which the electronic apparatus 510 is placed on the charger 500, for example.

Figure 10:
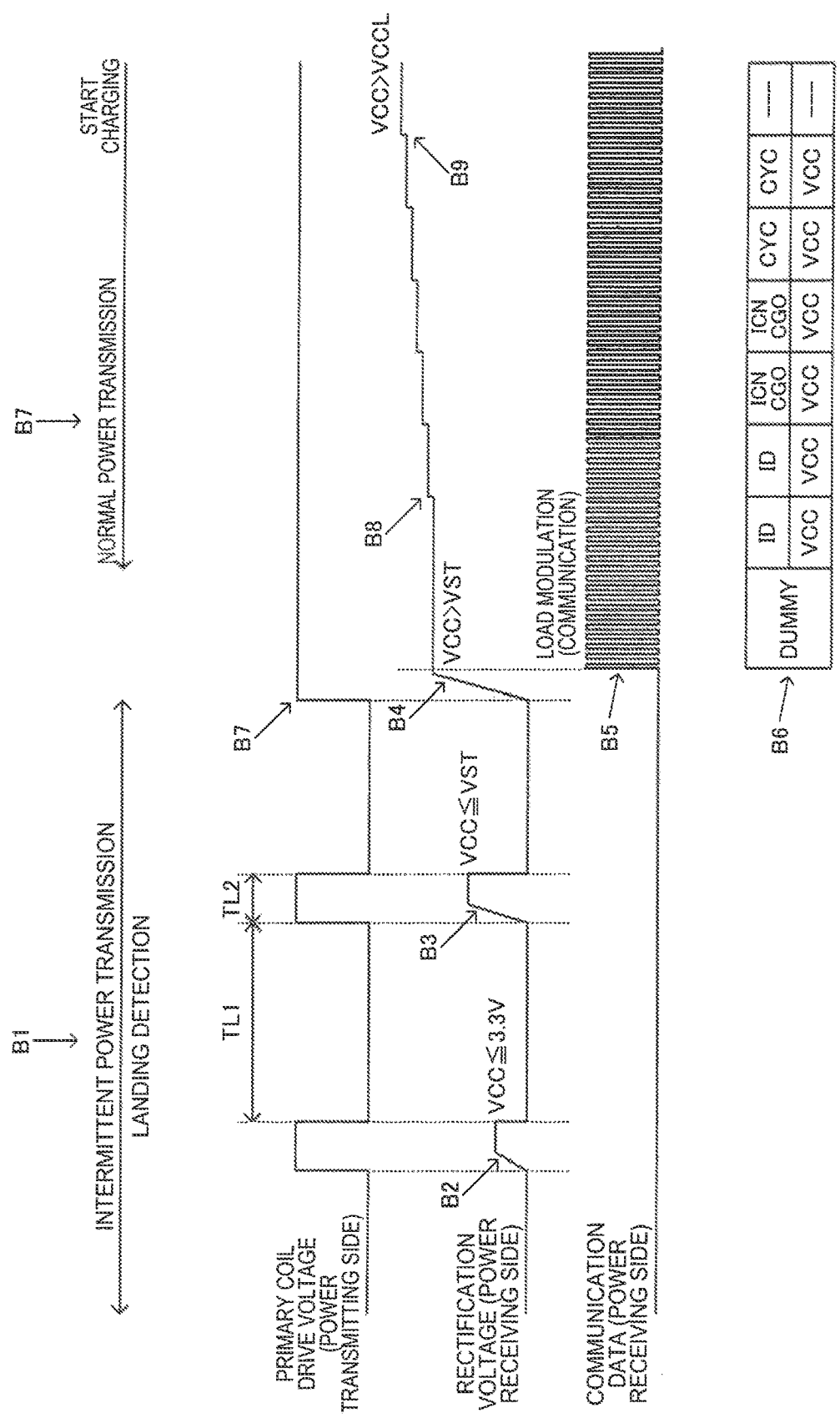
FIG. 10 is a signal waveform diagram for describing an operation sequence at the time of landing detection.
Figure 11:
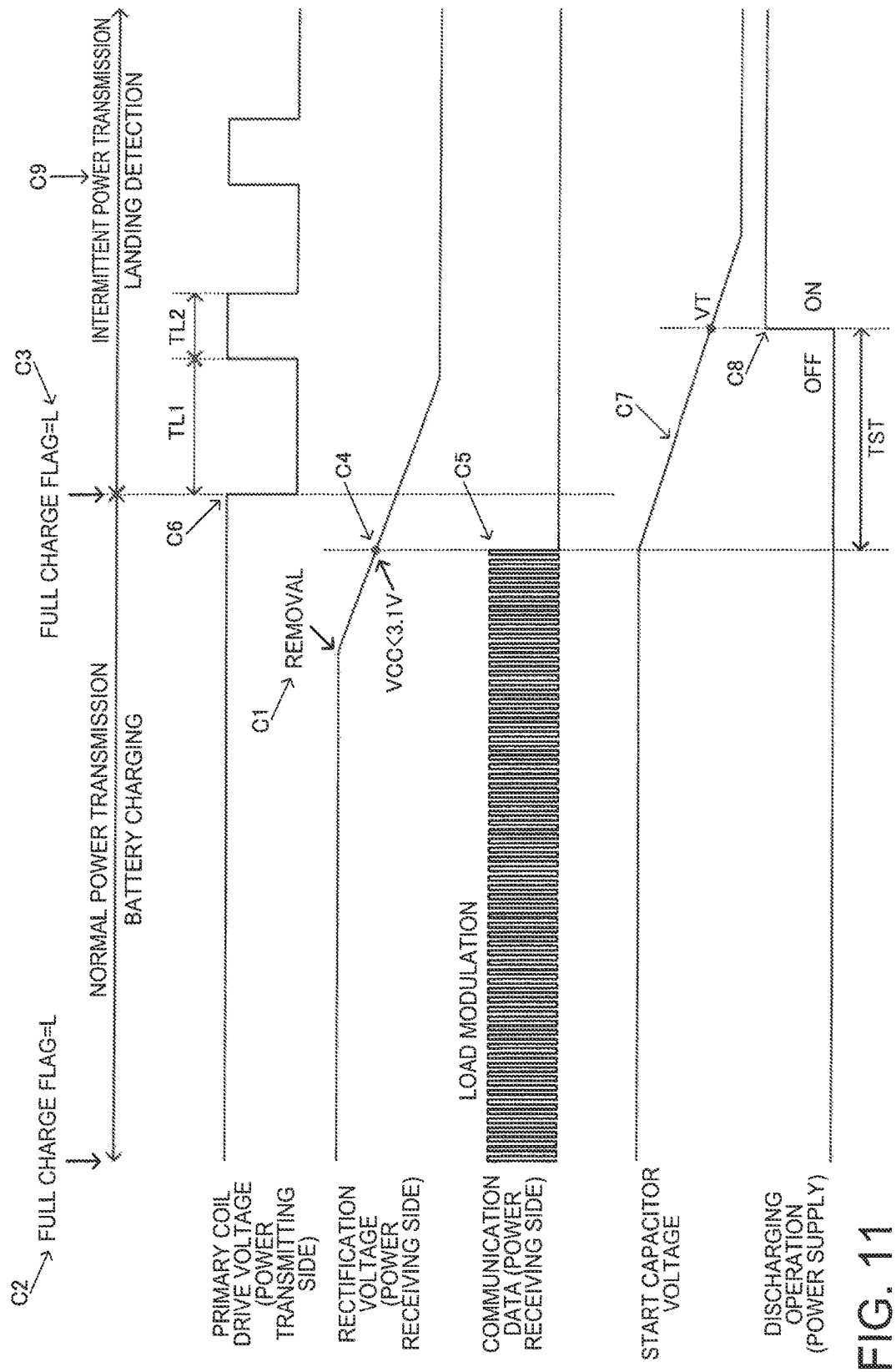
FIG. 11 is a signal waveform diagram for describing an operation sequence at the time of removal.
Figure 12:
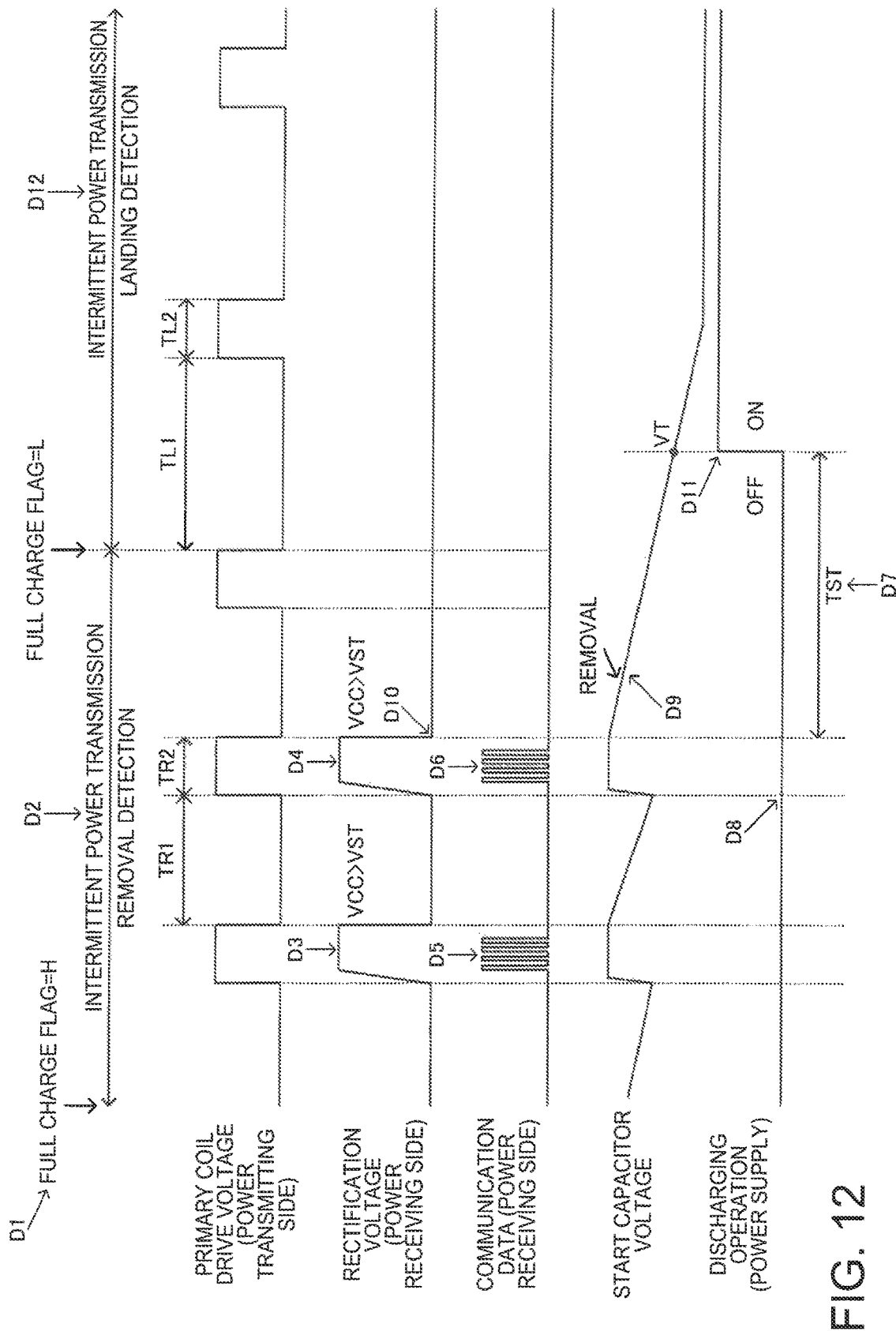
FIG. 12 is a signal waveform diagram for describing the operation sequence at the time of removal.

FIGS. 10 to 12 are signal waveform diagrams for describing a detailed operation sequence of the contactless power transmission system of the present embodiment.

B1 in FIG. 10 is the stand-by state in A1 in FIG. 9, and intermittent power transmission for landing detection is performed. That is, power transmission in a period TL2 is performed at the intervals of a period TL1. The period of TL1 is 3 s for example, and the period of TL2 is 50 ms for example. In B2 and B3 in FIG. 10, the rectified voltage VCC is less than or equal to the voltage VST (less than or equal to the first voltage), and therefore, communication by load modulation is not performed.

On the other hand, in 34, the rectified voltage VCC exceeds the voltage VST (4.5 V, for example), and therefore the load modulation portion 56 starts load modulation, as shown in B5. That is, although the coils L1 and L2 are not in a sufficiently electromagnetically coupled state in B2 and B3, the coils L1 and L2 are in a properly electromagnetically coupled state in B4, as shown in FIG. 6B. Accordingly, the rectified voltage VCC increases and exceeds the voltage VST, and load modulation is started, as shown in B5. Then, communication data as shown in B6 is transmitted to the power transmitting side by this load modulation. The start of the load modulation in B5 is triggered by the increase in the rectified voltage VCC due to the intermittent power transmission for landing detection shown in B7.

Specifically, the power receiving side transmits dummy data (64 bits of "0", for example) for landing detection. The power transmitting side detects landing of the power receiving side by detecting this dummy data (detecting 8 bits of "0", for example), and starts normal power transmission (continuous power transmission) as shown in B7.

Next, the power receiving side transmits information such as ID information or rectified voltage VCC. As described above, simplified authentication processing can be realized as a result of the power transmitting side making a reply with respect to the transmission of the ID information.

Also, the power transmitting side controls the transmitting power by receiving the transmitting power setting information, which is information of the rectified voltage VCC. As a result of the power transmitting side controlling the transmitting power, the rectified voltage VCC increases as shown in B8. Then, when the VCC exceeds the voltage VCCL (second voltage), as shown in B9, charging of the battery 90 is started.

In the present embodiment in this way, the voltage VST at which the load modulation (communication) is started can be set low. Accordingly, the occurrence of a failure such as a breakdown voltage abnormality caused by the drive voltage of the power transmitting side being set high can be suppressed. The transmitting power of the power transmitting side is controlled by transmitting the transmitting power setting information (VCC) to the power transmitting side by the started load modulation, and as a result of controlling the transmitting power, the rectified voltage VCC increases, as shown in B8. Then, when the rectified voltage VCC increases and exceeds the voltage VCCL, which is a chargeable voltage, as shown in B9, charging of the battery 90 is started. Accordingly, both of the landing detection over a large distance range and suppression of the occurrence of failure such as a breakdown voltage abnormality can be realized.

In C1 in FIG. 11, the electronic apparatus 510 is removed in a normal power transmission period during which charging of the battery 90 is performed. The removal in C1 is removal before the battery 90 is fully charged (full charge flag=Low level), as shown in C2 and C3.

When the electronic apparatus 510 is removed in this way, the power on the power transmitting side is not transmitted to the power receiving side, and the rectified voltage VCC decreases. Then, when VCC has decreased below 3.1 V, for example, as shown in C4, load modulation by the load modulation portion 56 is stopped, as shown in C5. When load modulation is stopped, normal power transmission by the power transmission portion 12 is stopped, as shown in C6.

Also, when the rectified voltage VCC decreases below 3.1 V, for example, which is a judgement voltage, discharge of an unshown start capacitor on the power receiving side is started. The start capacitor is a capacitor for starting up the discharging operation (for measurement of a start-up period) on the power receiving side, and is provided as a component external to the power receiving side control device 50, for example. When a start-up period TST elapses after the rectified voltage VCC has decreased below the judgement voltage (3.1 V), the discharging operation of the discharging portion 60 is switched from off to on, as shown in C8, and power from the battery 90 starts to be supplied to the power supply target 100. Also, the power transmission portion 12 starts to perform intermittent power transmission for landing detection, as shown in C9, after normal power transmission has been stopped.

Note that, in the present embodiment, a charging system control portion and a discharging system control portion are provided as the control portion 54 on the power receiving side. The charging system control portion operates by receiving a power supply voltage generated from the rectified voltage VCC (output voltage) of the power receiving portion 52. Meanwhile, the discharging system control portion and the discharging portion 60 operate by receiving a power supply voltage generated from the battery voltage VBAT. Charging/discharging control of the start capacitor and control of the discharging portion 60 (on/off control) are performed by the discharging system control portion.

In D1 in FIG. 12, the full charge flag is at a high level which is an active level, and the full charge of the battery 90 is detected. When the full charge is detected in this way, the intermittent power transmission for removal detection after full charge is performed, as shown in D2. That is, power transmission is performed during a period TR2 at the intervals of a period TR1. The period TR1 is 1.5 s, for example, and the period TR2 is 50 ms, for example. The period TR1 of the intermittent power transmission for removal detection is shorter than the period TL1 of the intermittent power transmission for landing detection.

The rectified voltage VCC of the power receiving portion 52 increases above VST due to the intermittent power transmission for removal detection, as shown in D3 and D4 in FIG. 12, and the load modulation is performed as shown in D5 and D6. The fact that the electronic apparatus 510 has not been removed can be detected on the power transmitting side by detecting the load modulation (null communication data or the like).

Also, the interval of the intermittent power transmission period TR1 (1.5 s, for example) for removal detection is shorter than the start-up period TST (longer than 3 s, for example) shown in D7 that is set by the aforementioned start capacitor. Therefore, in a state in which the electronic apparatus 510 is not removed, the voltage of the start capacitor (charge voltage) does not decrease below the threshold voltage VT for turning on the discharging operation, and switching from off to on of the discharging operation is not performed, as shown in D8.

On the other hand, the electronic apparatus 510 is removed in D9. The rectified voltage VCC decreases below 3.1 V which is the judgement voltage, as shown in D10, after the intermittent power transmission period TR2 for removal detection shown in D4 ends, and therefore measurement of the start-up period TST shown in D7 is started. Then, in D11, the voltage of the start capacitor decreases below the threshold voltage VT for turning on the discharging operation, and the elapse of the start-up period TST is detected. Accordingly, the discharging operation of the discharging portion 60 is switched from off to on, and power from the battery 90 begins to be supplied to the power supply target 100. Also, as shown in D12, intermittent power transmission for landing detection of the electronic apparatus 510 starts to be performed.

In the present embodiment as described above, on the condition that the power receiving device 40 has started the load modulation, as shown in B5 in FIG. 10, normal power transmission by the power transmission portion 12 is started, as shown in B7. While the load modulation in B5 continues, the normal power transmission shown in B7 continues. Specifically, as shown in C5 in FIG. 11, in the case where load modulation is no longer detected, normal power transmission by the power transmission portion 12 is stopped as shown in C6. Then, intermittent power transmission for landing detection by the power transmission portion 12 starts to be performed, as shown in 09.

In the present embodiment as described above, an operation sequence is adopted in which normal power transmission is started on the condition that the load modulation has started, the normal power transmission continues while load modulation continues, and the normal power transmission is stopped when the load modulation is not detected any more. In this way, contactless power transmission and communication by load modulation can be realized in a simple operation sequence. Also, as a result of performing communication by regular load modulation during a normal power transmission period, effective contactless power transmission according to the state of the power transmission or the like can be realized.

9. Communication Method

Figure 13:
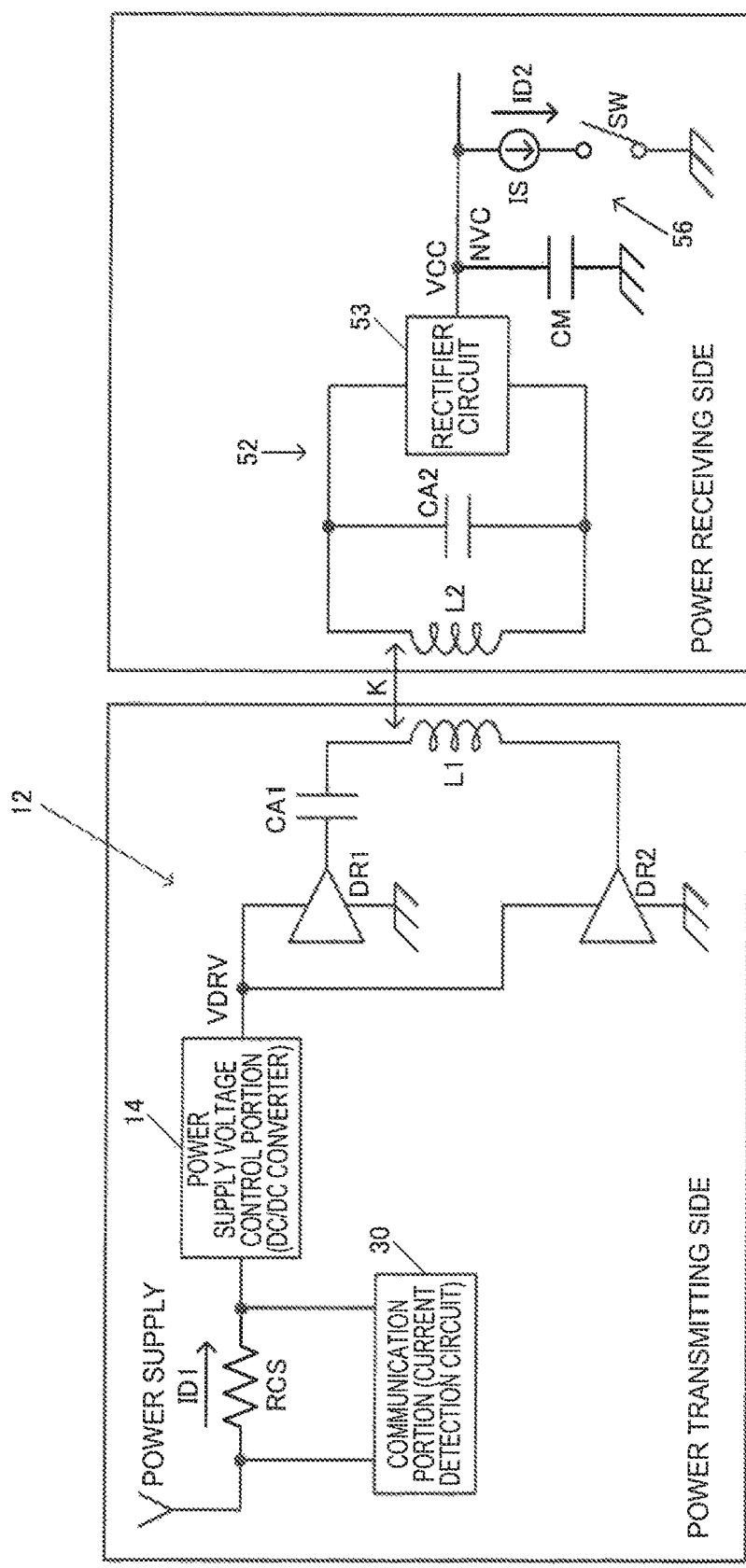
FIG. 13 is a diagram for describing a communication method using load modulation.

FIG. 13 is a diagram for describing a communication method by load modulation. The power transmission drivers DR1 and DR2 drive the primary coil L1 on the power transmitting side based on the power supply voltage VDRV supplied from the power supply voltage control portion 14, as shown in FIG. 13.

Meanwhile, on the power receiving side (secondary side), the coil end voltage of the secondary coil L2 is rectified by the rectifier circuit 53 in the power receiving portion 52, and a rectified voltage VCC is output to the node NVC. Note that the primary coil L1 and a capacitor CA1 constitute a resonance circuit on the power transmitting side, and the secondary coil L2 and a capacitor CA2 constitute a resonance circuit on the power receiving side.

On the power receiving side, a current ID2 of the current source IS is caused to intermittently flow from the node NVC to the GND side by turning on and off the switching element SW in the load modulation portion 56, and thereby the load state on the power receiving side (power receiving side voltage) is changed.

On the power transmitting side, a current ID1 that flows in a sense resistor RCS provided in a power supply line changes due to the change of the load state on the power receiving side caused by load modulation. For example, the sense resistor RCS for detecting the current that flows in a power supply is provided between the power supply (power supply device such as the power supply adapter 502 shown in FIG. 6A, for example) on the power transmitting side and the power supply voltage control portion 14. A power supply voltage is supplied from the power supply to the power supply voltage control portion 14 via the sense resistor RCS. A current ID1 that flows from the power supply to the sense resistor RCS changes due to the change of the load state on the power receiving side caused by load modulation, and the communication portion 30 detects the change in the current. Then, the communication portion 30 performs a detection operation for detecting communication data that is transmitted by load modulation based on the detection result.

10. Power Receiving Portion and Charging Portion

Figure 14:
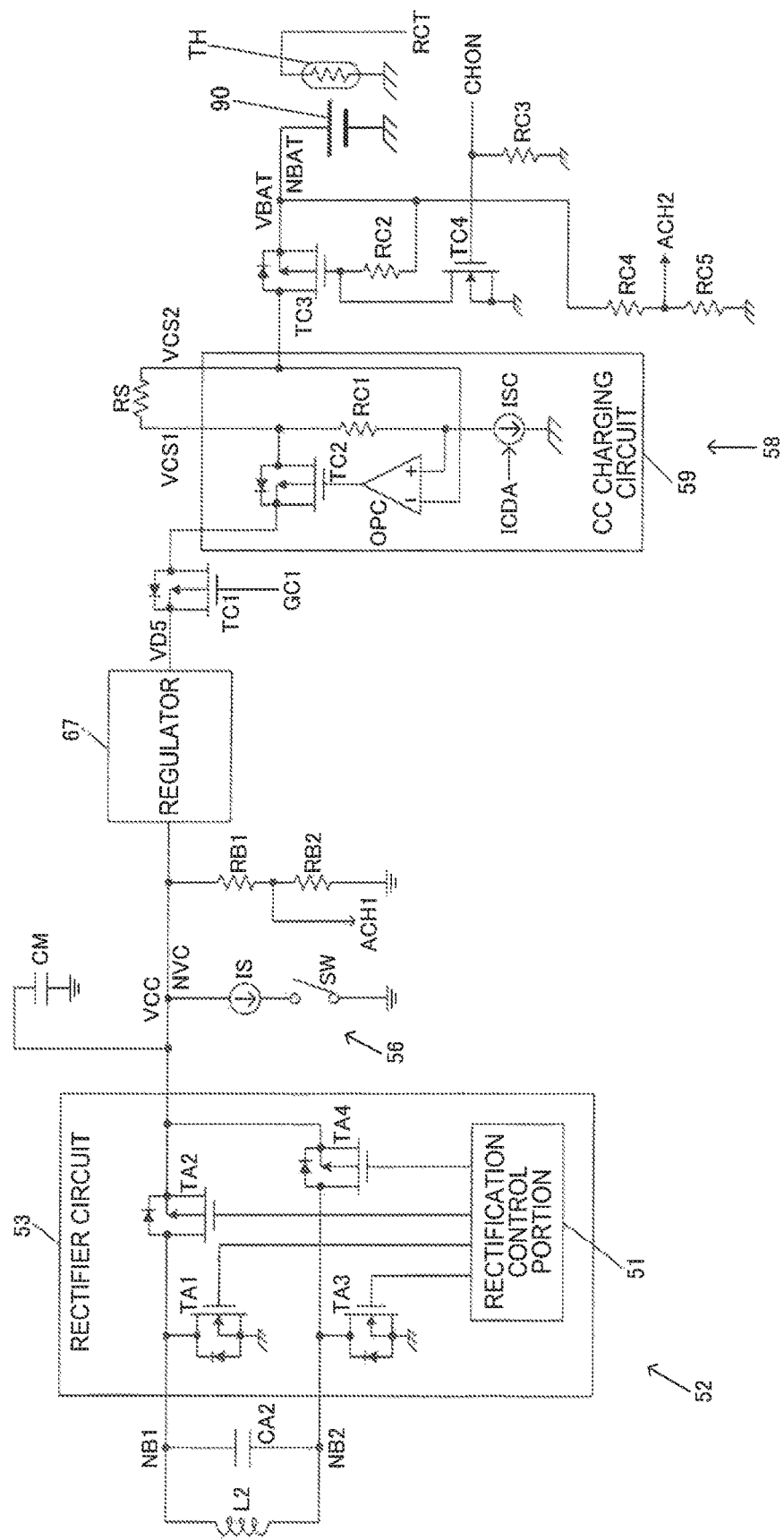
FIG. 14 is a detailed exemplary configuration of a power receiving portion and a charging portion.

A detailed exemplary configuration of the power receiving portion 52, the charging portion 58, and the like is shown in FIG. 14. The rectifier circuit 53 in the power receiving portion 52 includes transistors TA1, TA2, TA3, and TA4 for rectification and a rectification control portion 51 (rectification control circuit) for controlling these transistors TA1 to TA4, as shown in FIG. 14. A body diode is provided between a drain and a source of each of the transistors TA1 to TA4. The rectification control portion 51 performs rectification control for generating the rectified voltage VCC by outputting control signals to gates of the transistors TA1 to TA4.

Resistors RB1 and RB2 are provided in series between the node NVC of the rectified voltage VCC and the GND node. A voltage ACH1 that is generated by voltage-dividing the rectified voltage VCC with the resistors RB1 and RB2 is input to the A/D converter circuit 65, for example. Accordingly, monitoring of the rectified voltage VCC is made possible, and thus power control based on the VCC and control of communication start and charging start based on the VCC can be realized.

The regulator 67 performs voltage adjustment (regulation) on the rectified voltage VCC, and outputs a voltage VD5. The voltage VD5 is supplied to the CC charging circuit 59 in the charging portion 58 via a transistor TC1. The transistor TC1 is turned off with a control signal GC1 when an over-voltage of the battery voltage VBAT exceeding a given voltage is detected, for example. Note that circuits (circuits except for circuits in a discharging system such as the discharging portion 60) in the control device 50 operate with a voltage based on the voltage VD5 (voltage resulting from regulating VD5 or the like) as a power supply voltage.

The CC charging circuit 59 includes a transistor TC2, an operational amplifier OPC, a resistor RC1, and a current source ISC. Through virtual short of the operational amplifier OPC, the transistor TC2 is controlled such that the voltage (non-inverting input terminal voltage) on one end of the resistor RC1 is equal to the voltage VCS2 (inverting input terminal voltage) on another end of the sense resistor RS, which is an external component. The current that flows in the current source ISC by the control of the signal ICDA is represented as IDA, and the current that flows in the sense resistor RS is represented as IRS. Control is performed such that the equation IRS×RS=IDA×RC1 holds. That is, in the CC charging circuit 59, the current IRS (charge current) that flows in the sense resistor RS is controlled so as to be a constant current value that is set by the signal ICDA. In this way, CC (Constant-Current) charging is made possible.

A transistor TC3 is provided between an output node of the CC charging circuit 59 and a supply node NBAT of the battery voltage VBAT. A drain of an N-type transistor TC4 is connected to a gate of the P-type transistor TC3, and a charging control signal CHON from the control portion 54 is input to a gate of the transistor TC4. Also, a pull-up resistor RC2 is provided between the gate of the transistor TC3 and the node NBAT, and a pull-down resistor RC3 is provided between the gate of the transistor TC4 and a GND (power supply on a low potential side) node. The power supply switch 42 in FIG. 7 is realized by the transistor TC3 (TC4).

When charging is performed, the control portion 54 sets the control signal CHON to an active level (high level). Accordingly, the N-type transistor TC4 is turned on, and the gate voltage of the P-type transistor TC3 becomes a low level. As a result, the transistor TC3 is turned on, and the charging of the battery 90 is performed.

On the other hand, when the control portion 54 sets the control signal CHON to an inactive level (low level), the N-type transistor TC4 is turned off. The gate voltage of the P-type transistor TC3 is pulled up to the battery voltage VBAT by the resistor RC2, and as a result, the transistor TC3 is turned off and the charging of the battery 90 is stopped.

Also, when the power supply voltage of the charging system becomes lower than the operation lower limit voltage of the circuit, the gate voltage of the transistor TC4 is pulled down to GND by the resistor RC3, and thus the transistor TC4 is turned off. Also, the gate voltage of the transistor TC3 is pulled up to the battery voltage VBAT by the resistor RC2, and thus the transistor TC3 is turned off. In this way, when the power receiving side is removed, and the power supply voltage becomes lower than the operation lower limit voltage, as a result of the transistor TC3 being turned off, the path between the output node of the CC charging circuit 59 and the node NBAT of the battery 90 is electrically cut off. Accordingly, reverse flow from the battery 90 when the power supply voltage becomes less than or equal to the operation lower limit voltage can be prevented.

Resistors RC4 and RC5 are provided in series between the node NBAT and the GND node, and a voltage ACH2 that is generated by voltage-dividing the battery voltage VBAT with the resistors RC4 and RC5 is input to the A/D converter circuit 65. Accordingly, monitoring of the battery voltage VBAT is made possible, and various types of control can be realized based on the charge state of the battery 90. Also, a thermistor TH (temperature detection portion, in a broad sense) is provided in the vicinity of the battery 90. A voltage RCT on one end of the thermistor TH is input to the control device 50, and thereby measurement of the battery temperature is made possible.

Note that although this embodiment has been described above in detail, those skilled in the art will easily understand that various modifications are possible without substantially departing from the new matter and the effect of the invention. Accordingly, all those modifications are to be encompassed in the scope of the invention. For example, a term that is used at least once together with another term having a broader or the same meaning in the specification or the drawings may be replaced with the other term in any part of the specification or the drawings. All combinations of this embodiment and the modifications are also encompassed in the scope of the invention. Configurations, operations, or the like of the charge pump circuit, the detection circuit, the circuit device, the electronic apparatus, and the contactless power transmission system are not limited to those described in this embodiment either, and various modifications can be implemented.

This application claims priority from Japanese Patent Application No. 2016-024569 filed in the Japanese Patent Office on Feb. 12, 2016, the entire disclosure of which is hereby incorporated by reference in its entirely.

What is claimed is:
1. A circuit device comprising:
a power supply that supplies power from a battery to a power supply target, the power supply including a charge pump circuit that steps down a battery voltage VBAT of the battery to a voltage that is m/n times the battery voltage VBAT, where n is an integer of one or more and m is an integer of one or more and (n−1) or less, and supplies the stepped down voltage to the power supply target from a terminal; and
a processor that controls the power supply, the processor being programmed to stop a charge pump operation of the charge pump circuit when a voltage VOUT' at the terminal satisfies an expression VOUT'>VBAT×m/n.
2. The circuit device according to claim 1, further comprising:
a detection circuit to which the battery voltage VBAT and the voltage VOUT' at the terminal are input and that outputs a detection signal that is activated when the expression VOUT'>VBAT×m/n holds, wherein the processor is programmed to stop the charge pump operation when the detection signal is activated.

3. The circuit device according to claim 1, wherein the processor is programmed to stop the charge pump operation by deactivating a switching signal for a charge pump transistor included in the charge pump circuit when the expression VOUT'>VBAT×m/n holds.

4. The circuit device according to claim 1, wherein the processor is programmed to restart the charge pump operation that has been stopped when a predetermined restart condition is satisfied.

5. The circuit device according to claim 4, wherein the processor is programmed to restart the charge pump operation that has been stopped when predetermined operation information is input to an input of an electronic apparatus in which the circuit device is included.

6. The circuit device according to claim 1, wherein the power supply further includes:
  a charger that supplies power to the battery so as to charge the battery; and
  a discharger that includes the charge pump circuit and performs a discharging operation that supplies power charged to the battery to the power supply target.

7. The circuit device according to claim 6, wherein the power supply supplies power that has been received by a power receiver through contactless power transmission to the battery so as to charge the battery.

8. The circuit device according to claim 7, wherein the processor is programmed to:
  stop the discharging operation when the power receiver approaches a power transmitter that performs the contactless power transmission; and
  cause the discharger to perform the discharging operation in a removed period in which the power receiver is removed from the power transmitter.

9. A power receiving device comprising:
the circuit device according to claim 6.

10. An electronic apparatus comprising:
the circuit device according to claim 1.

* * * * *